(12) United States Patent
Hong et al.

(10) Patent No.: US 10,852,125 B2
(45) Date of Patent: Dec. 1, 2020

(54) APPARATUS FOR INSPECTING FILM ON SUBSTRATE BY USING OPTICAL INTERFERENCE AND METHOD THEREOF

(71) Applicant: KOH YOUNG TECHNOLOGY INC., Seoul (KR)

(72) Inventors: Young Joo Hong, Gwangmyeong-si (KR); Deok Hwa Hong, Gwangmyeong-si (KR); Min Kyu Kim, Gwangmyeong-si (KR); Jeong Hun Choi, Bucheon-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 0 days.

(21) Appl. No.: 16/202,543

(22) Filed: Nov. 28, 2018

(65) Prior Publication Data

US 2019/0162523 A1 May 30, 2019

(30) Foreign Application Priority Data

Nov. 28, 2017 (KR) .................. 10-2017-0160680
Nov. 7, 2018 (KR) .................. 10-2018-0136170

(51) Int. Cl.
*G01B 11/06* (2006.01)
*G01B 9/02* (2006.01)

(52) U.S. Cl.
CPC ...... *G01B 11/0675* (2013.01); *G01B 9/02091* (2013.01); *G01B 2210/56* (2013.01)

(58) Field of Classification Search
CPC ............ G01B 11/0675; G01B 9/02091; G01B 2210/56
See application file for complete search history.

(56) References Cited

U.S. PATENT DOCUMENTS 5,465,154 A 11/1995 Levy
5,530,551 A 6/1996 Cantrall et al.
5,657,124 A 8/1997 Zhang et al.
(Continued)

FOREIGN PATENT DOCUMENTS

CN 1073007 6/1993
CN 1123570 5/1996
(Continued)

OTHER PUBLICATIONS

Korean Office Action for Korean Application No. 10-2018-0136165, with English translation, dated Sep. 30, 2019.
(Continued)

*Primary Examiner* — Michael P LaPage
(74) *Attorney, Agent, or Firm* — Kile Park Reed & Houtteman PLLC

(57) ABSTRACT

A substrate inspection apparatus is disclosed. The substrate inspection apparatus according to the present disclosure may include: a light source configured to radiate laser light onto a coated film that is spread on a region of a substrate; a light detector configured to obtain optical interference data on an interference between reference light, that is generated by the laser light being reflected from a surface of the coated film, and measurement light, that is generated by the laser light penetrating the coated film and being scattered; and a processor configured to derive a thickness of the coated film corresponding to the region, based on the optical interference data.

14 Claims, 13 Drawing Sheets

(56) References Cited

U.S. PATENT DOCUMENTS

| | | | |
|---|---|---|---|
| 6,507,747 B1 | 1/2003 | Gowda et al. | |
| 9,250,186 B2 | 2/2016 | Farahi et al. | |
| 9,355,442 B2 | 5/2016 | Iwanaga et al. | |
| 9,389,064 B2 | 7/2016 | Liu et al. | |
| 9,453,725 B2 | 9/2016 | Baath | |
| 9,494,409 B2 | 11/2016 | Schonleber et al. | |
| 9,588,060 B2 | 3/2017 | Jung et al. | |
| 9,593,939 B1 | 3/2017 | Xie et al. | |
| 9,651,366 B2 | 5/2017 | Chern et al. | |
| 9,671,460 B2 | 6/2017 | Wei et al. | |
| 9,756,313 B2 | 9/2017 | Koren et al. | |
| 9,958,319 B2 | 5/2018 | Zur Nieden | |
| 2003/0090669 A1 | 5/2003 | Jung et al. | |
| 2007/0062447 A1 | 3/2007 | Hayashi et al. | |
| 2008/0062429 A1 | 3/2008 | Liang et al. | |
| 2010/0091243 A1 | 4/2010 | Bor | |
| 2012/0176623 A1* | 7/2012 | Lee | G01B 11/0675 356/503 |
| 2012/0320380 A1* | 12/2012 | Schonleber | G01B 11/0625 356/479 |
| 2015/0159995 A1 | 6/2015 | Tixier et al. | |
| 2015/0226537 A1 | 8/2015 | Schorre et al. | |
| 2015/0294468 A1 | 10/2015 | Shimizu et al. | |
| 2017/0027439 A1 | 2/2017 | Shimizu et al. | |
| 2017/0131087 A1 | 5/2017 | Tixier et al. | |
| 2017/0224219 A1 | 8/2017 | Hirayama et al. | |
| 2017/0284791 A1* | 10/2017 | Jing | G01B 11/0616 |
| 2018/0113326 A1* | 4/2018 | Gloege | G02C 7/107 |
| 2018/0195855 A1* | 7/2018 | Liu | G01B 11/2441 |

FOREIGN PATENT DOCUMENTS

| | | |
|---|---|---|
| CN | 1414377 | 4/2003 |
| CN | 1924517 | 3/2007 |
| CN | 106017337 | 10/2016 |
| CN | 106104199 | 11/2016 |
| CN | 209399935 | 9/2019 |
| EP | 2 535 680 | 12/2012 |
| JP | 61-212705 | 9/1986 |
| JP | 62-011106 | 1/1987 |
| JP | 64-9449 | 1/1989 |
| JP | 03-252512 | 11/1991 |
| JP | 8-309262 | 11/1996 |
| JP | 2007-198771 | 8/2007 |
| JP | 2010-281580 | 12/2010 |
| JP | 2013-205253 | 10/2013 |
| JP | 2014-100230 | 6/2014 |
| KR | 10-2014-0133992 | 11/2014 |
| KR | 10-2017-0085279 | 7/2017 |
| TW | 201305528 | 2/2013 |
| WO | 2014/192734 | 12/2014 |
| WO | 2016/067570 | 5/2016 |

OTHER PUBLICATIONS

Korean Office Action for Korean Application No. 10-2018-0136170, with English translation, dated Sep. 30, 2019.
Japanese Office Action for Japanese Application No. 2018-222330, with English translation, dated Nov. 5, 2019.
Japanese Office Action for Japanese Application No. 2018-222331, with English translation, dated Nov. 5, 2019.
Extended European Search Report for European Application No. 18208781.7; dated Mar. 7, 2019.
Extended European Search Report for European Application No. 18208784.1; dated Mar. 7, 2019.
Korean Office Action, with English translation, corresponding to Korean Application No. 10-2018-0136170, dated Apr. 28, 2020.
United States Office Action corresponding to U.S. Appl. No. 16/202,450, dated Mar. 10, 2020.
Chinese Office Application, with English translation, corresponding to Chinese Application No. or Publication No. 201811433244.3, dated Jun. 19, 2020.
Chinese Office Application, with English translation, corresponding to Chinese Application No. or Publication No. 201811434729.4, dated Jun. 11, 2020.
Korean Office Action, with English translation, corresponding to Korean Application No. 10-2020-0090258, dated Oct. 21, 2020.

* cited by examiner

FIG. 5
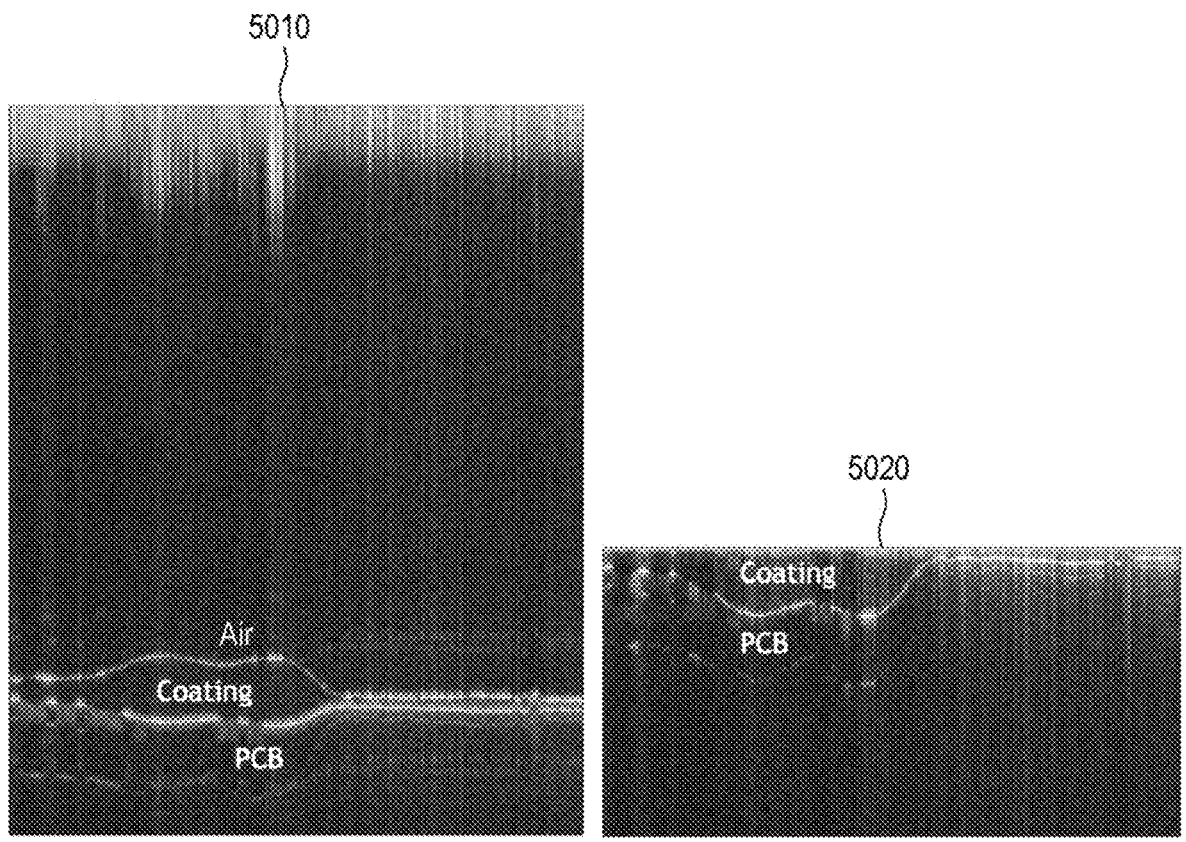
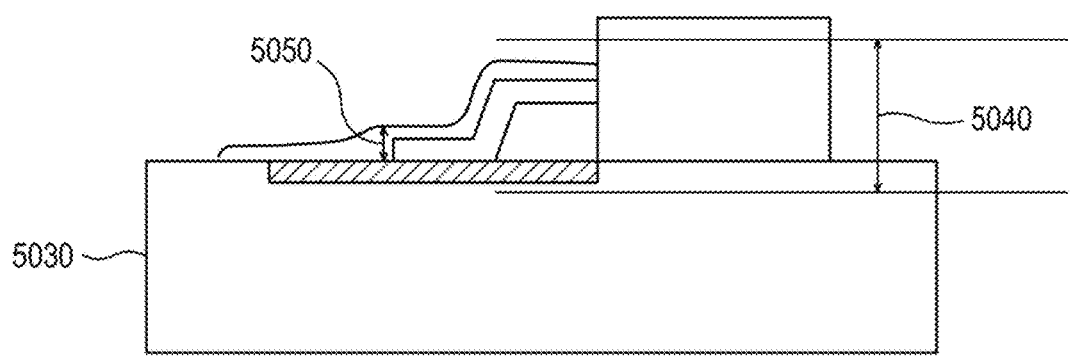

FIG. 8
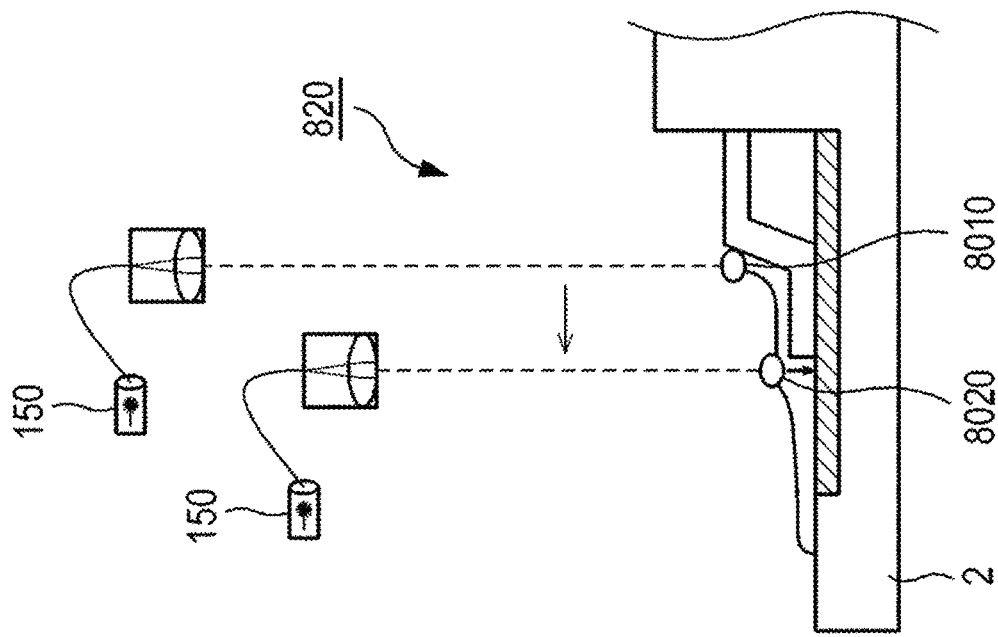
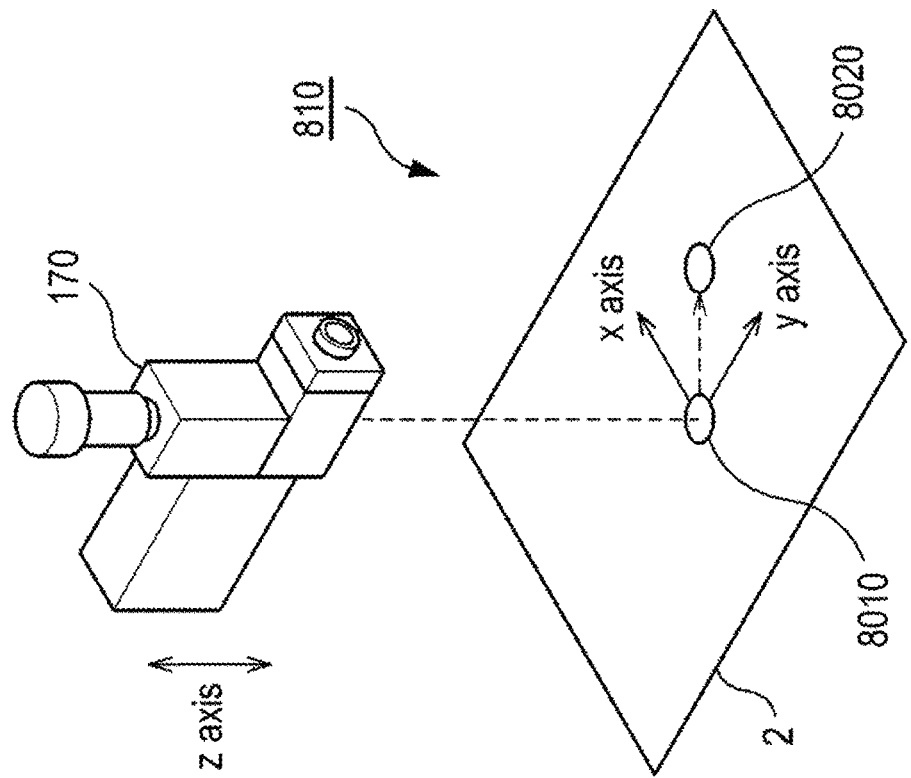

APPARATUS FOR INSPECTING FILM ON SUBSTRATE BY USING OPTICAL INTERFERENCE AND METHOD THEREOF

CROSS-REFERENCE TO RELATED APPLICATION(S)

The present application claims priority from Korean Patent Application Nos. 10-2017-0160680 (filed on Nov. 28, 2017) and 10-2018-0136170 (filed on Nov. 7, 2018), the entire subject matters of which are incorporated herein by reference.

TECHNICAL FIELD

The present disclosure relates to a substrate inspection apparatus and a substrate inspection method.

BACKGROUND

In a substrate-processing process, a substrate may be coated in order to protect elements on the substrate. The coating process is referred to as conformal coating. The thickness of a conformal coated film may be inspected in order to check whether the coated film formed on the substrate by coating is evenly coated to have a certain thickness.

For inspecting a thickness of the coated film, a two-dimensional (2D) fluorescent photographic inspection may be performed. However, the 2D photographic inspection performs only qualitative inspection on the thickness of the coated film, and may not accurately measure the thickness of the coated film. Also, it is difficult to use the 2D photographic inspection to measure the thickness when the coated film is thin (e.g., about 30 μm).

In order to inspect the thickness of the coated film, a method using an optical coherence tomography (OCT) may be used. However, saturation of light may occur due to reflection by a reference mirror during the thickness inspection of the coated film using the OCT, and thus, an error may occur during thickness measurement. Also, since there are many elements of the OCT, such as a reference mirror, a window glass, a beam splitter and the like, it is difficult to implement the OCT in a small size.

SUMMARY

Some embodiments of the present disclosure provide a technology for measuring a thickness of a coated film of a substrate.

In accordance with an aspect of the present disclosure, there is provided a substrate inspection apparatus. The substrate inspection apparatus according to an aspect of the present disclosure may include: a light source configured to radiate laser light onto a coated film that is spread on a region of a substrate; a light detector configured to obtain optical interference data on an interference between reference light, that is generated by the laser light being reflected from a surface of the coated film, and measurement light, that is generated by the laser light penetrating the coated film and being scattered; and a processor configured to derive a thickness of the coated film corresponding to the region, based on the optical interference data.

According to an embodiment, the processor may be configured to: obtain a sectional image that shows a section cut in a depth direction of the coated film based on the optical interference data; and determine the thickness of the coated film based on boundary lines in the sectional image.

According to an embodiment, the substrate inspection apparatus may further include a movement part configured to move the light source.

According to an embodiment, the processor may be further configured to: derive a reflectivity of the surface of the coated film based on an intensity of the reference light; and control the movement part to move the light source in case the reflectivity is less than a predetermined reflectivity.

According to an embodiment, the light source may be further configured to radiate the laser light onto the coated film along a first direction, and the light detector may be further configured to capture the reference light and the measurement light that proceed along a direction opposite to the first direction, and obtain the optical interference data.

According to an embodiment, the light source may be disposed such that the laser light is directly radiated onto the surface of the coated film without penetrating a medium other than air.

According to an embodiment, the reflectivity of the surface of the coated film with respect to the laser light may be determined based on a fluorescent pigment mixing ratio of fluorescent pigments that are mixed in the coated film, and the fluorescent pigment mixing ratio may be set to a value that enables the reflectivity to exceed a predetermined reference value.

According to an embodiment, the coated film may be formed of at least one material selected from acrylic, urethane, polyurethane, silicone, epoxy, an ultraviolet (UV) curable material, and an infrared (IR) curable material.

According to an embodiment, the surface of the coated film may be formed to be a curved surface.

In accordance with an aspect of the present disclosure, there is provided a substrate inspection method. The substrate inspection method according to an aspect of the present disclosure may include the steps of: radiating laser light onto a coated film that is spread on a region of a substrate; obtaining optical interference data on an interference between reference light, that is generated by the laser light being reflected from a surface of the coated film, and measurement light, that is generated by the laser light penetrating the coated film and being scattered; and deriving a thickness of the coated film corresponding to the region, based on the optical interference data.

According to an embodiment, the step of deriving the thickness of the coated film may include: obtaining a sectional image that shows a section cut in a depth direction of the coated film, based on the optical interference data; and determining the thickness of the coated film based on boundary lines in the sectional image.

According to an embodiment, the substrate inspection method may further include: deriving a reflectivity of the surface of the coated film based on an intensity of the reference light; and moving the light source in case the reflectivity is less than a predetermined reflectivity.

According to an embodiment, the laser light may be radiated onto the region along a first direction, and the reference light and the measurement light proceed along a direction opposite to the first direction.

According to an embodiment, the laser light may be directly radiated onto the surface of the coated film without penetrating a medium other than air.

According to an embodiment, the reflectivity of the surface of the coated film with respect to the laser light may be determined based on a fluorescent pigment mixing ratio of fluorescent pigments that are mixed in the coated film, and the fluorescent pigment mixing ratio may be set to a value that enables the reflectivity to exceed a predetermined reference value.

According to an embodiment, the coated film may be formed of at least one material selected from acrylic, urethane, polyurethane, silicone, epoxy, an UV curable material, and an IR curable material.

According to an embodiment, the surface of the coated film may be formed to be a curved surface.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 5 is a diagram illustrating a measurement range of the inspection apparatus 10 in the depth direction according to an embodiment of the present disclosure.

FIG. 8 is a diagram illustrating a process of adjusting a thickness measurement region based on the reflectivity of the coated film according to an embodiment of the present disclosure;

DETAILED DESCRIPTION

Figure 1:
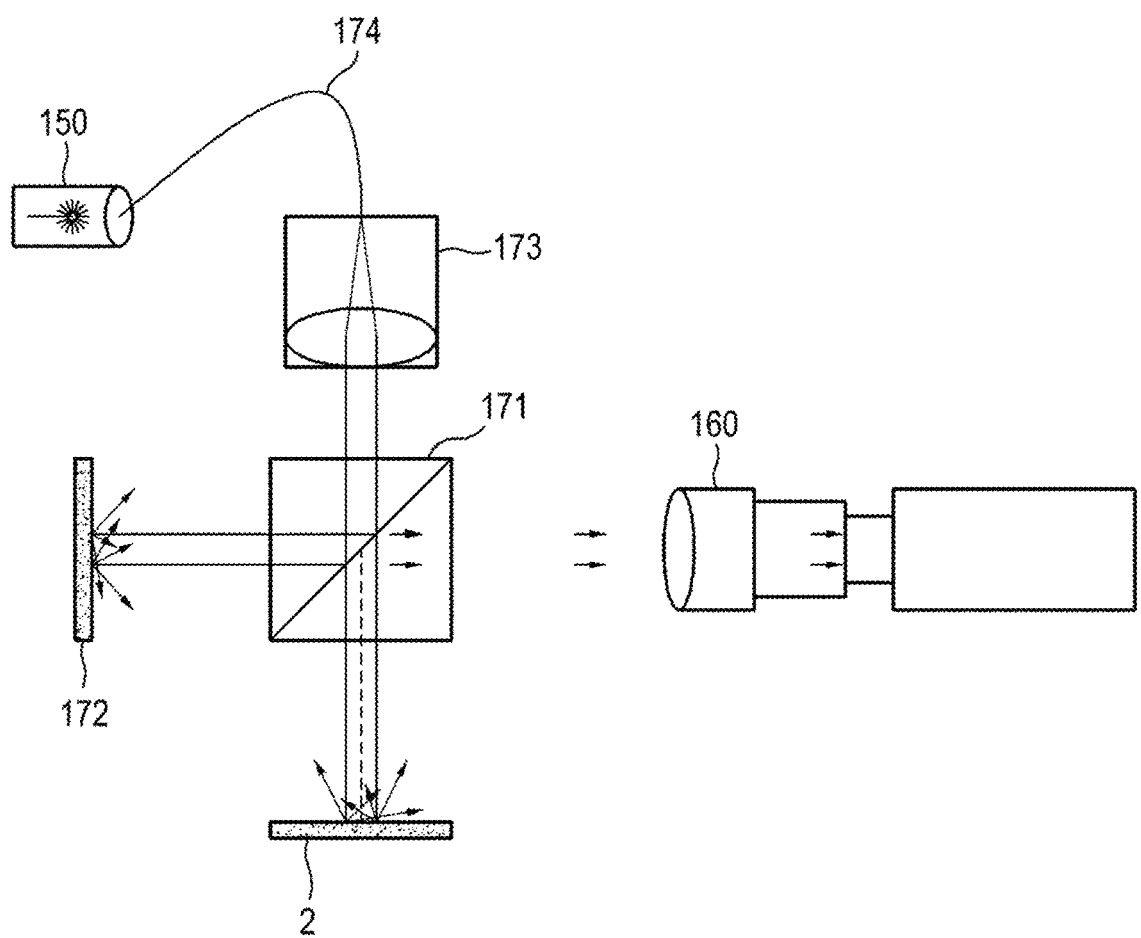
FIG. 1 is a diagram illustrating an embodiment of a process in which a substrate inspection apparatus according to the present disclosure operates.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments. Various embodiments disclosed in the present document are illustrated for the purpose of accurate description of the technical idea of the present disclosure, which should not be construed to be limited to a predetermined embodiment. The technical idea of the present disclosure may include various modifications, equivalents, alternatives of the embodiments provided in the present document, and may include a combination of embodiments selected from some or all of the embodiments. Also, the scope of rights of the technical idea of the present disclosure is not limited to various embodiments provided below or to the detailed descriptions thereof.

The terms used in the present document, including technical or scientific terms, have meanings which are generally understood by those skilled in the art that the present disclosure belongs to, unless otherwise defined.

The expressions such as "comprise", "may comprise", "include", "may include", "have", "may have", and the like, used in the present document, indicate that a feature (e.g., a function, an operation, an element, or the like), which is the object of the expression, exists, and do not exclude other additional features. That is, the expressions should be understood as open-ended terms including the possibility that another embodiment exists.

In the present document, an expression in the singular form may include the meaning of the plural form, unless otherwise specified, and this will be equally applied to an expression in the singular form included in the claims.

The expressions such as "1st", "2nd", "first", "second", and the like, used in the present document are used to distinguish one object from another object when designating a plurality of objects of the same kind, unless otherwise specified, and the expressions may not define the order of the objects or the importance of the objects.

The expressions such as "A, B, and C", "A, B, or C", "A, B, and/or C", "at least one of A, B, and C", "at least one of A, B, or C", "at least one of A, B, and/or C", and the like indicate listed items or all possible combinations of listed items. For example, "at least one of A or B" indicates (1) at least one A, (2) at least one B, or (3) at least one A and at least one B.

The expression "part" used in the present document may indicate software or a hardware element, such as a field-programmable gate array (FPGA), an application specific integrated circuit (ASIC), or the like. However, "part" is not limited to hardware and software. An element corresponding to "part" may be configured to be stored on a storage medium capable of performing addressing, or may be configured to execute one or more processors. According to an embodiment, "part" may include elements, such as software elements, object-oriented software elements, class element, and task elements, or the like, and may include processors, functions, attributes, procedures, sub-routines, segments of program code, drivers, firmware, microcode, circuits, data, databases, data structures, tables, arrays, and variables.

The expression "based on" used in the present document is used to describe one or more factors that affect determination, an operation of making a decision, or an operation described in a phrase or a sentence including the corresponding expression, and the expression does not exclude additional factors that affect the corresponding determination, the operation of making a decision, or the other operation.

In the present document, the expression "an element (e.g., a first element) is connected or linked to another element (e.g., a second element)" may indicate that the element is directly connected or linked to the other element, or may indicate that the element is connected or linked to the other element using a new element (e.g., a third element) as a medium.

The expression "configured to" used in the present document may include meanings, such as "set to", "has an ability to", "changed so as to", "made to", "able to", and the like. The expression is not limited to "designed specially in terms of hardware." For example, a processor configured to perform a predetermined operation may be a general-purpose processor that is capable of performing the predetermined operation by executing software.

To describe various embodiments of the present disclosure, an orthogonal coordinate system may be defined, the system including the x-axis, the y-axis, and the z-axis, which are orthogonal to each other. The expressions used in the present document, such as "x-axis direction", "y-axis direction", "z-axis direction", and the like in association with the orthogonal coordinate system, may indicate both directions in which each axis in the orthogonal coordinate system extends, unless otherwise specified. Also, the "+" sign put in front of the direction of each axis indicates the positive direction, which is one of the directions in which the corresponding axis extends. The "−" signal put in front of the direction of each axis indicates the negative direction, which is the other of the directions in which the corresponding axis extends.

In the present disclosure, a substrate is a board or a container in which elements such as a semiconductor chip and the like are installed, and the substrate may act as a passageway of electric signals among elements. The substrate may be used to manufacture an integrated circuit or the like, and may be formed of a material such as silicone or the like. For example, the substrate may be a printed circuit board (PCB), and may be referred to as a wafer or the like depending on the embodiment.

In the present disclosure, a coated film may be a thin film, which is generated on the substrate by coating in order to protect the elements installed on the substrate. When the coated film is thick, the film may be broken and may affect the operation of the substrate. Accordingly, the coated film needs to be coated relatively thinly and evenly in order to prevent the coated film from breaking. According to an embodiment, the coated film may be formed of at least one material selected from acrylic, urethane, polyurethane, silicone, epoxy, an ultraviolet (UV) curable material, and an infrared (IR) curable material. In the case of the coated film formed of at least one of the above-described materials, the reflectivity of the surface of the coated film and/or the backscattering ratio of the coated film may be higher than those of other coated films.

In the present disclosure, an optical coherence tomography (OCT) is an imaging technology that captures an image of the inside of an object using optical interference. Using the OCT, an image that shows the inside of an object in the depth direction from the surface of the object may be obtained. Generally, the OCT is based on an interferometer. The depth resolution with respect to the object may be different based on the wavelength of the light that is used. The OCT may obtain an image by more deeply penetrating the object than a confocal microscope, which is another optical technology.

Hereinafter, various embodiments of the present disclosure will be described with reference to attached drawings. In the drawings and descriptions of the drawings, the same or substantially equivalent elements may be assigned the same reference numeral. Also, in various embodiments described below, overlapping descriptions of the same elements or corresponding elements may be omitted. However, this does not mean that an element for which a description is omitted is not included in the corresponding embodiment.

FIG. 1 is a diagram illustrating an embodiment of a process in which a substrate inspection apparatus according to the present disclosure operates. The substrate inspection apparatus according to an embodiment may be a substrate inspection apparatus of a type that uses a reference mirror. In the embodiment, the substrate inspection apparatus may further include a light source 150, a light detector 160, a reference mirror 172, and/or a beam splitter 171.

In the substrate inspection apparatus that uses the reference mirror, the beam splitter 171 may adjust an optical path of laser light radiated from the light source 150, and the reference mirror 172 may reflect the laser light transferred from the beam splitter 171 so as to generate reference light. In the substrate inspection apparatus according to the embodiment, the laser light may be reflected from a coated film of a substrate 2, whereby measurement light is generated. Optical interference data may be obtained from the interference light between reference light and measurement light. The substrate inspection apparatus may generate a sectional image from the optical interference data, and may measure the thickness of the coated film.

Particularly, the light source 150 may radiate the laser light. According to an embodiment, the light source 150 may directly radiate the laser light onto the beam splitter 171. According to an embodiment, the light source 150 may transfer the laser light to a convex lens 173 via an optical fiber 174, and the laser light passing through the convex lens 173 may be transferred to the beam splitter 171.

The beam splitter 171 may adjust an optical path such that part of the laser light received from the light source 150 passes through the beam splitter 171 and proceeds to the coated film of the substrate 2, and may adjust an optical path such that another part of the laser light is reflected and proceeds to the reference mirror 172.

The part of the laser light of which the optical path is adjusted such that the part of laser light proceeds to the coated film of the substrate 2, may be reflected from the coated film of the substrate 2. The reflected light may be referred to as the measurement light. The measurement light may proceed to the beam splitter 171, and may be transferred to the light detector 160 by the beam splitter 171. The other part of the laser light of which the optical path is adjusted such that the other part of the laser light proceeds to the reference mirror 172 may be reflected by the reference mirror 172. The reflected light may be referred to as the reference light. The reference light may pass through the beam splitter 171, and may be transferred to the light detector 160.

The light detector 160 may capture the interference light generated by interference between the measurement light and the reference light, and may obtain the optical interference data. In the present disclosure, the optical interference data may indicate data obtained from the interference light that is generated by the interference between the measurement light and the reference light when object measurement is performed using the OCT. The measurement light is a radiated light reflected from an object, and the reference light is a radiated light reflected from a reference mirror or the like. An interference phenomenon may occur by a difference in the features (optical path, wavelength, or the like) of the measurement light and the reference light, and the light detector may capture the interference phenomenon and may obtain the optical interference data. Also, based on the optical interference data, a sectional image indicating a section cut in the depth direction of the coated film may be generated. The optical interference data may also be referred to as an interference signal. The substrate inspection apparatus that uses the reference mirror may derive the thickness of the coated film spread on the substrate 2 using the optical interference data associated with the reference light and the measurement light.

Figure 2:
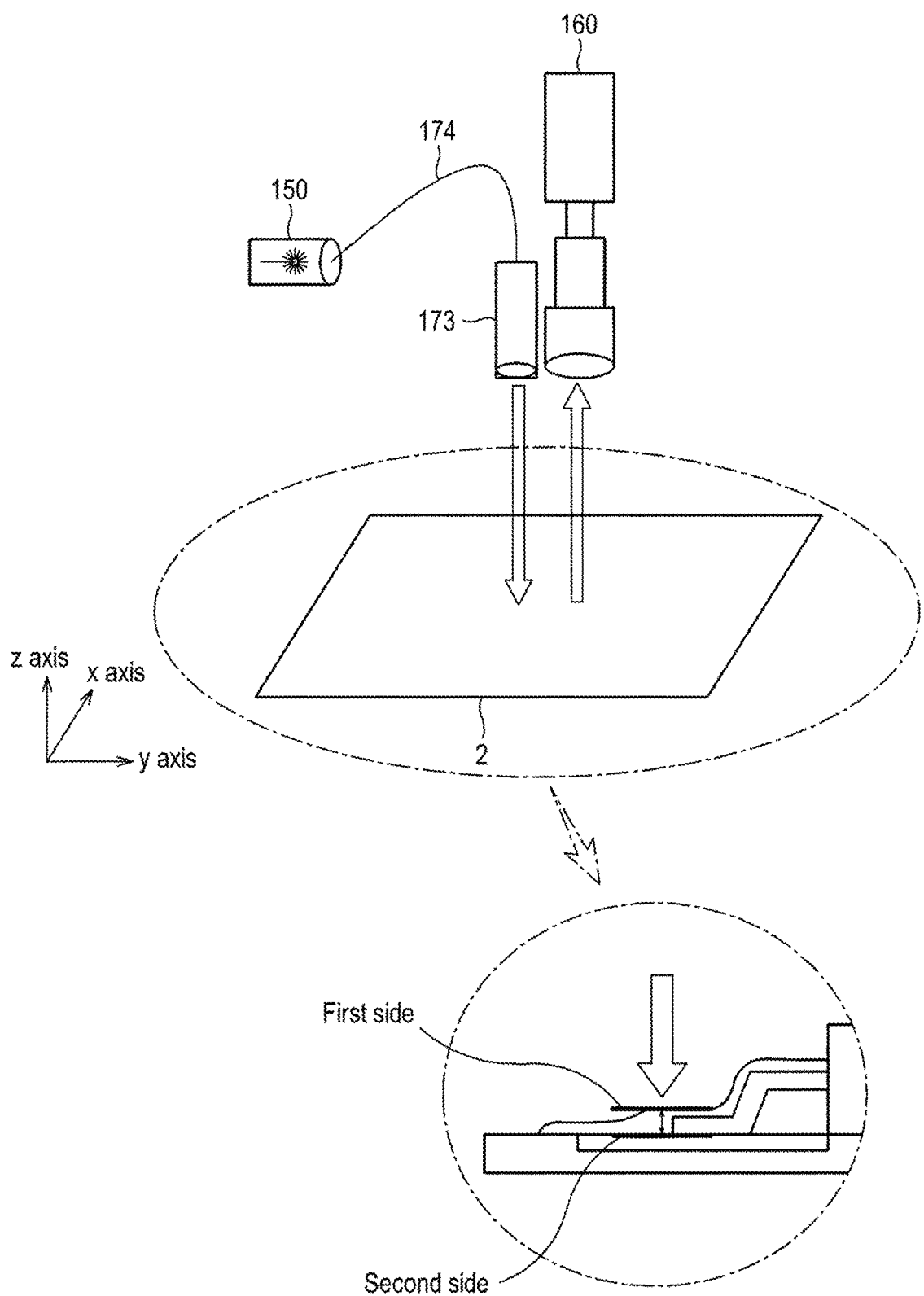
FIG. 2 is a diagram illustrating an embodiment of a process in which a substrate inspection apparatus according to the present disclosure operates.

FIG. 2 is a diagram illustrating an embodiment of a process in which the substrate inspection apparatus according to the present disclosure operates. The substrate inspection apparatus according to the present disclosure may be implemented as an inspection apparatus 10 according to various embodiments. The substrate inspection apparatus according to the present disclosure may be a substrate inspection apparatus of a type that does not use the above-described reference mirror.

The inspection apparatus 10 according to various embodiments of the present disclosure may measure the thickness of the coated film of the substrate 2 using the OCT. According to an embodiment, the inspection apparatus 10 may measure the thickness of the coated film using reflected light that is reflected from the surface of the coated film, without using the above-described reference mirror, a predetermined window glass, or the like.

Particularly, the inspection apparatus 10 according to the present disclosure may include the light source 150 and/or the light detector 160, excluding the reference mirror 172 or the beam splitter 171. The light source 150 of the inspection apparatus 10 may radiate the laser light onto the coated film of the substrate 2. In this instance, the laser light may be radiated in a first direction. The first direction may be a direction corresponding to a straight line inclined at a predetermined angle from the direction of a normal line of the substrate. According to an embodiment, the first direction may be the same as the direction of the normal line of the substrate. The axis corresponding to the direction of the normal line of the substrate is referred to as the z-axis. The z-axis may be a direction corresponding to the depth direction of the coated film. As described above, the light source 150 may directly radiate the laser light, but may alternatively radiate the laser light via the optical fiber 174 and/or the convex lens 173.

In the present disclosure, the x-axis and the y-axis may be axes included in a plane corresponding to the surface of the substrate 2. The x-axis and the y-axis may be orthogonal to each other on the corresponding plane. Also, the x-axis and the y-axis may be orthogonal to the above-described z-axis.

The laser light may be reflected from the surface of the coated film. Particularly, the laser light may be reflected from a first side shown in FIG. 2. Also, the laser light may penetrate the coated film and may be backscattered. Here, the reflected light that is reflected from the surface of the coated film may act as the above-described reference light, and the scattered light may act as the measurement light. That is, the reference light is generated by the laser light being reflected from the surface of the coated film, and the measurement light is generated by the laser light penetrating the coated film and being scattered. The reflected light (i.e., reference light) and the scattered light (i.e., measurement light) may proceed along the direction opposite to the above-described first direction, and may generate the interference light. That is, the radiated laser light and the above-described interference light (i.e., the reflected light and the scattered light) may proceed along the same axis, but in different respective directions. The light detector 160 may capture the interference light (i.e., the reflected light and the scattered light) that proceeds along the direction opposite to the first direction. The light detector 160 may obtain the optical interference data from the captured interference light. The processor 110 may obtain the optical interference data from the light detector 160, may generate a sectional image based on the optical interference data, and may derive the thickness of the coated film spread on a corresponding region of the substrate 2.

As described above, when the inspection apparatus 10 according to the present disclosure measures the thickness of the coated film, the above-described reflected light and scattered light may respectively act as the reference light and the measurement light of the substrate inspection apparatus that uses the above-described reference mirror. In other words, the coated film itself of the substrate 2 may act as the above-described reference mirror 172, depending on the reflectivity thereof. According to an embodiment, the inspection apparatus 10 may not dispose an additional element, such as a window glass or the like, on the coated film of the substrate 2. The inspection apparatus 10 according to the present disclosure may generate the interference light using the reflected light that is reflected from the surface of the coated film as the reference light. Therefore, the inspection apparatus 10 may not additionally need an element such as the window glass or the like.

Figure 3:
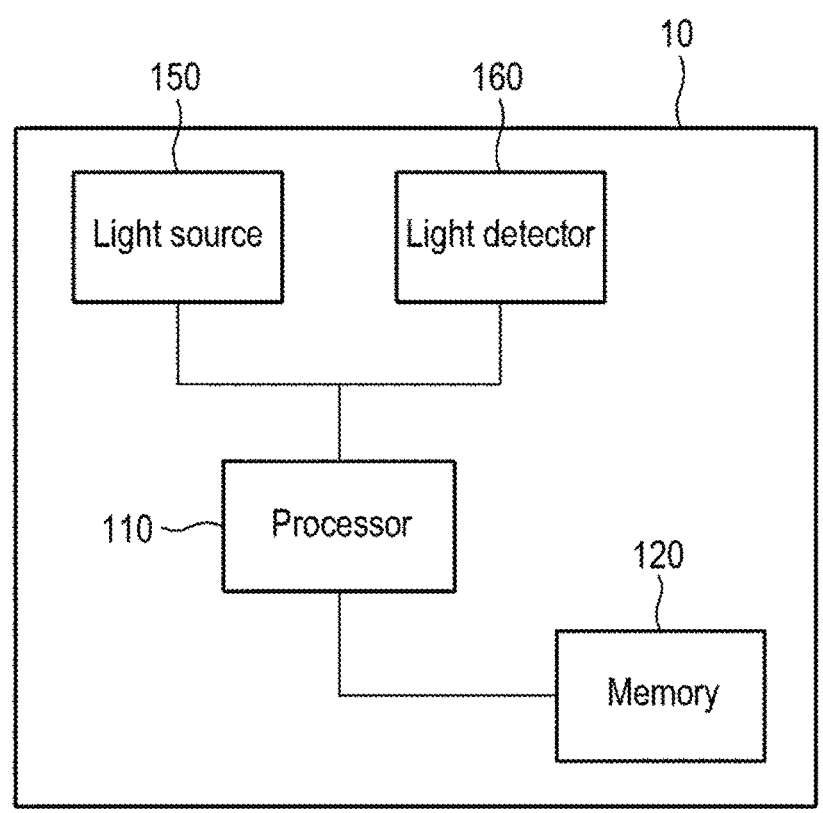
FIG. 3 is a block diagram illustrating an inspection apparatus 10 according to various embodiments of the present disclosure.

FIG. 3 is a block diagram illustrating the inspection apparatus 10 according to various embodiments of the present disclosure. As described above, the inspection apparatus 10 may include the light source 150 and the light detector 160, and may further include a processor 110 and a memory 120. According to an embodiment, at least one of the elements of the inspection apparatus 10 may be omitted or other elements may be added to the inspection apparatus 10. Additionally or alternatively, some of the elements may be implemented so as to be integrated, or may be implemented as a single or a plurality of entities. At least some of the elements disposed in the interior or the exterior of the inspection apparatus 10 may be connected via a bus, a general purpose input/output (GPIO), a serial peripheral interface (SPI), or a mobile industry processor interface (MIPI), or the like, and may exchange data and/or signals therebetween.

The light source 150 may radiate the laser light to the coated film of the substrate 2, as described above. The arrangement, the relative position, or the like of the light source 150 on the substrate may be variously configured. According to an embodiment, the light source 150 may be disposed in the above-described z-axis. According to an embodiment, the light source 150 may use laser of which the wavelength is variable within a short time, whereby the optical interference data corresponding to different wavelengths may be obtained using the same. According to an embodiment, the inspection apparatus 10 may include a plurality of light sources 150.

The light detector 160 may capture the interference light generated from the coated film by laser light. Particularly, the light detector 160 may capture the interference light generated by the reflected light (i.e., the reference light), that is generated by laser light being reflected from the surface of the coated film, and the scattered light (i.e., the measurement light), which is generated by laser light penetrating to a predetermined depth from the coated film and being back-scattered. A sectional image based on the surface of the coated film may be generated using the optical interference data obtained by capturing the interference light. According to an embodiment, the light detector 160 may be disposed on the above-described z-axis. According to an embodiment, the light detector 160 may not be disposed on the z-axis. In this instance, a predetermined additional element may adjust an optical path such that the reflected light and the scattered light proceed to the light detector 160. According to an embodiment, the inspection apparatus 10 may include a plurality of light detectors 160. The light detector 160 may be implemented as a charge-coupled device (CCD) or a complementary metal-oxide-semiconductor (CMOS). According to an embodiment, the light source 150 and the light detector 160 together may be referred to as the OCT part 170 of the inspection apparatus 10.

The processor 110 may control at least one element of the inspection apparatus 10 connected to the processor 110 by running software (e.g., a program). Also, the processor 110 may perform various operations, processing, data generation, and other processes in association with the present disclosure. Also, the processor 110 may load data or the like from the memory 120, or may store data or the like in the memory 120.

The processor 110 may obtain the optical interference data associated with the above-described interference light, from the light detector 160. The processor 110 may derive the thickness of the coated film that is spread on a region of the substrate 2 to which laser light is radiated, based on one or more pieces of optical interference data. The process of deriving the thickness of the coated film from the optical interference data will be described later.

The memory 120 may store various data. The data stored in the memory 120 may be data obtained, processed, or used by at least one element of the inspection apparatus 10, and may include software (e.g., a program). The memory 120 may include a transitory memory and/or a non-transitory memory. The memory 120 may store one or more pieces of optical interference data obtained from the light detector 160. Also, the memory 120 may store element arrangement information, element density information, and electrode position information which will be described later.

In the present disclosure, a program may be software stored in the memory 120, and may include an operating system for controlling resources of the inspection apparatus 10, applications, and/or middleware that provides various functions to the application such that the applications utilize the resources of the inspection apparatus 10.

According to an embodiment, the inspection apparatus 10 may further include a communication interface (not illustrated). The communication interface may enable wired or wireless communication between the inspection apparatus 10 and a server or between the inspection apparatus 10 and an external electronic device. For example, the communication interface may perform wireless communication based on long-term evolution (LTE), LTE Advanced (LTE-A), code division multiple access (CDMA), wideband CDMA (WCDMA), wireless broadband (WiBro), Wi-Fi, Bluetooth, near field communication (NFC), global positioning system (GPS) or global navigation satellite system (GNSS), or the like. For example, the communication interface may perform wired communication based on a universal serial bus (USB), a high definition multimedia interface (HDMI), recommended standard 232 (RS-232), a plain old telephone service (POTS), or the like.

According to an embodiment, the processor 110 may obtain information from a server by controlling the communication interface. The information obtained from the server may be stored in the memory 120. According to an embodiment, information obtained from the server may include the element arrangement information, the element density information, the electrode position information, or the like which will be described later.

According to an embodiment, the inspection apparatus 10 may further include an additional light source 130 and an additional light detector 140. The additional light source 130 and the additional light detector 140 may be used to obtain a two-dimensional (2D) image of the coated film of the substrate 2, and to measure the thickness of the coated film.

According to an embodiment, the inspection apparatus 10 may further include a movement part to be described later. The movement part may move the light source 150 or the OCT part 170 along the above-described x-axis, y-axis, or z-axis.

According to an embodiment, the inspection apparatus 10 may further include an input device (not illustrated). The input device may be a device that receives, from the outside, data which is to be transferred to at least one element of the inspection apparatus 10. For example, the input device may include a mouse, a keyboard, a touch pad, or the like.

According to an embodiment, the inspection apparatus 10 may further include an output device (not illustrated). The output device may be a device to provide various data, such as an inspection result, an operation state, and the like associated with the inspection apparatus 10, to a user in a visual form. For example, the output device may include a display, a projector, a hologram device, or the like.

According to an embodiment, the inspection apparatus 10 may be provided in one of the various types of devices. For example, the inspection apparatus 10 may be a portable communication device, a computer device, a portable multimedia device, or a wearable device, or may be a combination of one or more of the above-described devices. The inspection apparatus 10 of the present disclosure is not limited to the above-described devices.

Various embodiments of the inspection apparatus 10 according to the present disclosure may be applied in combination. Many combinations of the embodiments as the possible number of cases may exist, and the embodiments of the inspection apparatus 10 resulting from such combination may also be included in the scope of the present disclosure. Also, the elements disposed in the interior or the exterior of the inspection apparatus 10 according to the present disclosure may be added, modified, replaced, or removed depending on the embodiment. Also, the elements disposed in the interior or the exterior of the inspection apparatus 10 may be implemented as hardware components.

Figure 4:
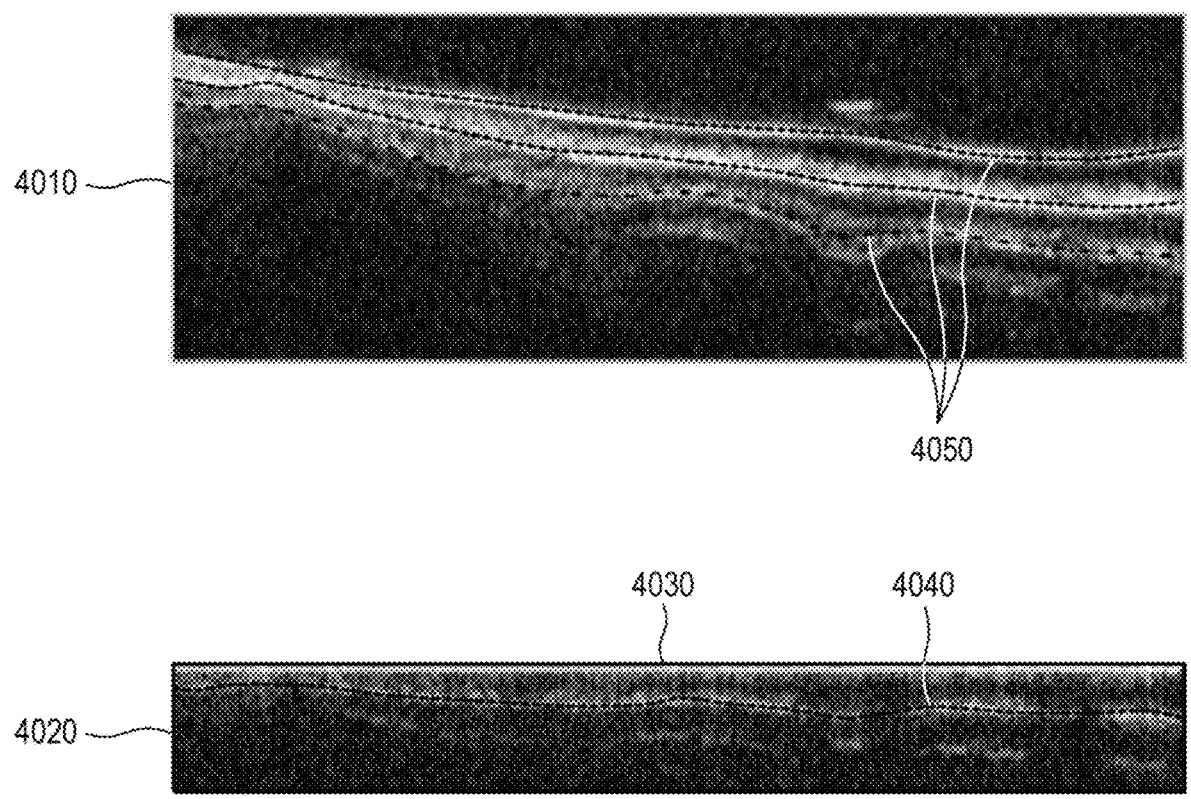
FIG. 4 is a diagram illustrating a sectional image and a boundary line in the sectional image according to an embodiment of the present disclosure.

FIG. 4 is a diagram illustrating a sectional image and a boundary line in the sectional image according to an embodiment of the present disclosure. As described above, the processor 110 may derive the thickness of the coated film spread on a predetermined region of the substrate 2, from the obtained optical interference data. The processor 110 may generate a sectional image from the optical interference data, and may derive the thickness of the coated film using the information obtained from the sectional image.

According to the present disclosure, in object measurement using the OCT, the sectional image is a 2D image of a section cut in the depth direction of an object (i.e., the coated film). The sectional image may be generated based on the measured optical interference data. The sectional image may include boundary lines (boundary patterns) corresponding to the boundary between air and the coated film, and the boundary between the coated film and the substrate.

Particularly, the processor 110 may obtain the sectional image as shown in FIG. 4, using the optical interference data obtained by the light detector 160. The sectional image may be an image of a section cut in the −z-axial direction, that is, the depth direction, of the substrate 2 and the coated film. That is, the sectional image may show the inside of the coated film and the substrate, via penetration in the depth direction from the surface of the coated film.

A sectional image 4010 shown in FIG. 4 may be a sectional image that may be obtained by the substrate inspection apparatus that uses the above-described reference mirror. The sectional image 4010 may include one or more boundary lines 4050. Each of the boundary lines 4050 may be the boundary between the air and the coated film, in other words, a boundary line corresponding to the surface of the coated film, or may be a boundary line corresponding to the boundary between the coated film and the substrate 2 or an electrode on which the coated film is spread. The substrate inspection apparatus using the reference mirror may derive the thickness of the coated film using the distance between the boundary lines corresponding to the respective boundaries.

Particularly, in the case of the substrate inspection apparatus using the reference mirror, the sectional image 4010 which is based on a reference mirror surface may be obtained. The substrate inspection apparatus using the reference mirror may determine a boundary line indicating the boundary between air and the coated film, from the sectional image 4010. Also, the substrate inspection apparatus may determine a boundary line indicating the boundary between the coated film and the substrate 2 on which the coated film is spread, from the sectional image 4010. The substrate inspection apparatus may derive a vertical distance between the two determined boundary lines from the sectional image 4010, and may determine the vertical distance as the thickness of the coated film.

Meanwhile, when a substrate inspection apparatus according to the present disclosure (e.g., the inspection apparatus 10) is used, a sectional image 4020 that is based on the surface of the coated film may be obtained. The sectional image 4020 may include one or more boundary lines 4040. One of the boundary lines 4040 may be a boundary line corresponding to the boundary between the coated film and the substrate 2 or the electrode on which the coated film is spread. The processor 110 of the inspection apparatus 10 may derive the thickness of the coated film using an interval between the corresponding boundary line 4040 and the upper edge 4030 of the sectional image 4020.

In the case of the inspection apparatus 10 according to the present disclosure, the processor 110 may detect the boundary line 4040 indicating the boundary between the coated film and the substrate 2 on which the coated film is spread. According to an embodiment, the processor 110 may determine, as the boundary line 4040, a boundary line that appears first in the depth direction from the upper edge of the sectional image 4020. Also, in the case of the inspection apparatus 10, the optical interference data is generated using the reflected light which is reflected from the surface of the coated film. Accordingly, the sectional image may show a section cut in the −z-axial direction, that is, in the depth direction, from the surface of the coated film by taking the surface of the coated film as an origin point. Therefore, the upper edge 4030 of the sectional image 4020 obtained by the inspection apparatus 10 may correspond to the surface of the coated film. The processor 110 may derive the vertical distance between the detected boundary line 4040 and the upper edge 4030 of the sectional image 4020, and may determine the vertical distance as the thickness of the coated film. According to an embodiment, the processor 110 may determine, as the thickness of the coated film, a value derived by applying a predetermined scaling factor to the derived vertical distance.

According to an embodiment, in the case of thickness measurement of the coated film of the substrate 2 using the OCT, the laser light, the reflected light, the scattered light, and/or the interference light may move in the vacuum or in some other mediums, instead of air. That is, the light source 150 may be disposed so as to directly radiate the laser light onto the surface of the coated film, without penetrating a medium other than air.

FIG. 5 is a diagram illustrating a measurement range of the inspection apparatus 10 in the depth direction according to an embodiment of the present disclosure. A sectional image 5010 shown in FIG. 5 may be a sectional image that may be obtained by the substrate inspection apparatus that uses the above-described reference mirror. The corresponding sectional image 5010 may include a boundary line indicating the boundary between air and the coated film, and a boundary line indicating the boundary between the coated film and the substrate (PCB). Also, a sectional image 5020 shown in FIG. 5 may be a sectional image obtained by the substrate inspection apparatus (e.g., the inspection apparatus 10) according to the present disclosure. The sectional image 5020 may include a boundary line indicating the boundary between the coated film and the substrate (PCB).

According to an embodiment, the sectional image 5010 may be bigger than the sectional image 5020. That is, the amount of data of the sectional image 5010 may be bigger than that of the sectional image 5020. In the case of the measurement by the inspection apparatus 10, unlike the case that uses the reference mirror, the reflected light which is reflected from the surface of the coated film is used as the reference light and thus, the start of the measurement range in the depth direction (the −z-axial direction) is limited to the surface of the coated film.

Referring to a sectional image 5030 shown in FIG. 5, in the case of the inspection apparatus that uses the reference mirror, a measurement range 5040, which takes into consideration all differences in height among the elements installed on the substrate 2, may be needed in order to obtain a meaningful measurement result. However, in the case of the thickness measurement of the coated film using the inspection apparatus 10, a meaningful thickness measurement result may be obtained using only a measurement range 5050 corresponding to the maximum predicted thickness of the coated film. In other words, the inspection apparatus 10 may reduce a measurement range in the depth direction, which is needed in order to measure the thickness of the coated film, whereby the computational capacity required for processing measurement results and memory for storage may be reduced.

Also, in the case of the thickness measurement of the coated film using the inspection apparatus 10, the reference mirror is not used, and thus, the possibility of a measurement error attributable to saturation of the reflected light may be reduced. When the intensity of output of the radiated light exceeds a predetermined intensity of light, the intensity of reflected light also increases, whereby saturation of the interference light may occur. In the case of the saturation, an interference signal may appear, irrespective of an interference signal generated by a measurement object, thereby impeding accurate measurement. Such saturation may more frequently occur in the case of a high reflective reference mirror. The inspection apparatus 10 excludes the use of the reference mirror, whereby a measurement error by the saturation may be reduced.

Figure 6:
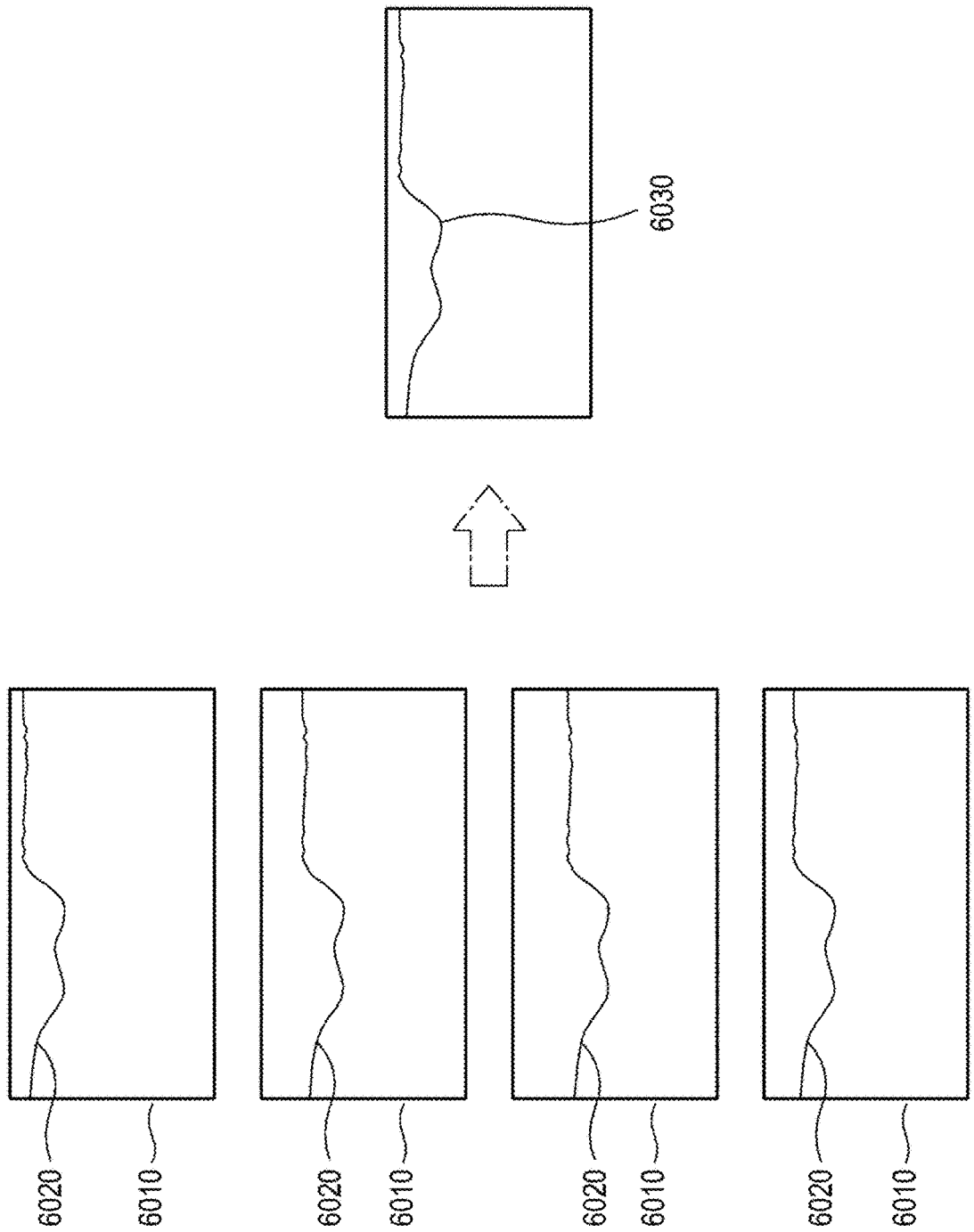
FIG. 6 is a diagram illustrating a process in which a processor 110 derives the thickness of a coated film based on a plurality of boundary lines according to an embodiment of the present disclosure.

FIG. 6 is a diagram illustrating a process in which the processor 110 derives the thickness of the coated film based on a plurality of boundary lines according to an embodiment of the present disclosure. According to an embodiment, the inspection apparatus 10 may use a plurality of sectional images of a predetermined region, which are obtained in advance and stored in a memory, so as to derive the thickness of the coated film of the corresponding region. To this end, the plurality of sectional images are obtained in advance via multiple measurements, and may be stored in the memory. Accordingly, the inspection apparatus 10 may derive the thickness of the coated film by minimizing effect of noise.

As described above, the processor 110 may obtain a sectional image based on one or more pieces of the optical interference data. The substrate inspection apparatus may obtain a plurality of sectional images 6010 of a predetermined region of the substrate by repeating measurement a number of times, and the plurality of sectional images may be stored in the memory. Each of the plurality of sectional images 6010 may show a section cut in the z-axis, that is, the depth direction of the coated film of the substrate 2. Each of the plurality of sectional images 6010 may include boundary lines 6020 indicating the boundary between the coated film and the substrate 2.

The processor 110 may obtain a plurality of boundary lines 6020 from the sectional images 6010, respectively. The processor 110 may determine one boundary line among the plurality of boundary lines 6020 as a boundary line 6030 indicating the boundary between the coated film and one region of the substrate 2 on which the coated film is spread. The processor 110 may derive the thickness of the coated film based on the determined boundary line, according to above-described method.

According to an embodiment, the processor 110 may derive a mean value, a median value or a mode value of the plurality of boundary lines 6020, and may determine a boundary line corresponding to the mean value, the median value or the mode value as the boundary line 6030 indicating the boundary between the coated film and the substrate 2. The processor may derive the thickness of the coated film corresponding to the one region of the corresponding boundary, based on the determined boundary line 6030.

In the present disclosure, the mean value may be a value obtained by adding the values of all samples and dividing the sum by the number of the samples. In the present disclosure, the median value may be a value in the middle of all sample values. When the values of the samples are arranged in ascending order, and the number of the samples is an odd number, the middle one is determined as the median value. When the number of the samples is an even number, the mean value of the two values in the middle is determined as the median value. In the present disclosure, the mode value may be a value that most frequently appears from among the values of samples. Particularly, the mean value, the median value, or the mode value of the boundary lines may indicate the mean value, the median value, or the mode value of location coordinates of the corresponding boundary lines in the sectional image. That is, when the sectional image is considered as a plane of the x-axis and the y-axis, each point of the boundary line in the corresponding sectional image may have x and y coordinate values. The mean value, the median value, or the mode value of x and y coordinate values in each of the plurality of boundary lines 6020 of the plurality of sectional images 6010 may be derived, and a boundary line corresponding to the derived coordinate values may be the boundary line 6030 corresponding to the mean value, the median value, or the mode value.

Figure 7:
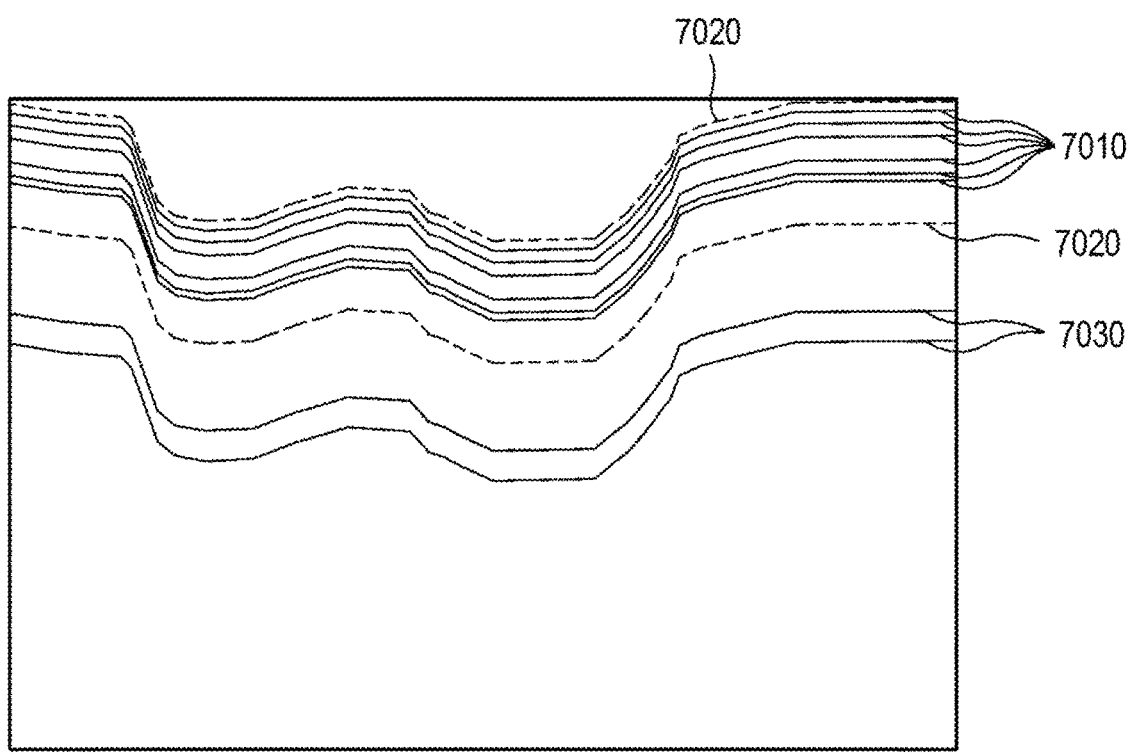
FIG. 7 is a diagram illustrating a process in which the processor 110 excludes some boundary lines based on a predetermined criterion, according to an embodiment of the present disclosure.

FIG. 7 is a diagram illustrating a process in which the processor 110 excludes some boundary lines based on a predetermined reference, according to an embodiment of the present disclosure. According to an embodiment, the processor 110 may derive the mean value of the plurality of boundary lines 6020, may exclude a boundary line that is different by at least a predetermined ratio from the derived mean value, and may use the remaining boundary lines to determine a boundary line, which is to be used as a basis for deriving the thickness of the coated film. By excluding a boundary line that falls outside a predetermined range from the plurality of boundary lines 6020, a value including an apparent measurement error may be excluded when coated film thickness measurement is performed. Through the above, more accurate thickness measurement may be allowed.

Particularly, the processor 110 may derive a first mean value of the plurality of boundary lines 6020. The process of deriving the mean value of the boundary lines may be performed as described above. The processor 110 may exclude boundary lines 7030 that are different by at least a predetermined ratio from the derived first mean value from the plurality of boundary lines 6020. That is, when the range of the derived first mean value which is determined based on a predetermined ratio is a region existing between broken lines 7020, the processor 110 may maintain boundary lines 7010 included in the corresponding region, and may exclude the boundary lines 7030 existing outside the region via a subsequent processing. The processor 110 may derive a second mean value of the boundary lines 7010 remaining after excluding the boundary lines 7030 that are different by at least the predetermined ratio. The process of deriving the mean value of the boundary lines may be performed as described above. The processor 110 may determine a boundary line corresponding to the derived second mean value as the boundary line indicating the boundary between the coated film and the substrate 2. The processor may derive the thickness of the coated film corresponding to the one region of the corresponding boundary, based on the determined boundary line.

According to an embodiment, the processor 110 may exclude a predetermined boundary line as described above, using the median value or the mode value, instead of the mean value. For example, the processor 110 may derive a first median value of the plurality of boundary lines 6020, may exclude a boundary line that is different by at least a predetermined ratio from the first median value, and may determine a boundary line corresponding to a second median value of the remaining boundary lines as the boundary line which is to be used as a basis for deriving the thickness of the coated film. In the same manner, the mode value may be utilized. According to an embodiment, a combination of the mean value, the median value, or the mode value may also be used.

FIG. 8 is a diagram illustrating a process of adjusting a thickness measurement region based on the reflectivity of the coated film according to an embodiment of the present disclosure. According to an embodiment, when the reflectivity of the surface of the coated film is greater than or equal to a predetermined reference value, the inspection apparatus 10 that does not use the reference mirror may be used. The predetermined reference value may be the minimum reflectivity that is needed when the surface of the coated film performs the role of the reference mirror 172. In the case of the thickness measurement without using the reference mirror according to the present disclosure, the reflectivity of the surface of the coated film may indicate a ratio of the reflected light (i.e., the reference light) reflected from the surface of the coated film to the laser light radiated onto the coated film.

According to an embodiment, the inspection apparatus 10 may derive the reflectivity of the coated film based on the intensity of the reflected light (e.g., the reference light) reflected from the surface of the coated film, and may move the light source 150 or the OCT part 170 based on the reflectivity, so as to measure the thickness. The inspection apparatus 10 that does not use the reference mirror may obtain the optical interference data based on the reflectivity of the coated film. Accordingly, the inspection apparatus 10 may finely adjust a measurement object point based on the reflectivity of the coated film, and may obtain a more meaningful measurement result.

Particularly, the light detector 160 may measure the intensity of the reference light when capturing the interference light by the above-described reflected light (i.e., the reference light) and scattered light (i.e., the measurement light). The processor 110 may derive the reflectivity of the surface of the coated film in the z-axial direction at a corresponding region based on the measured intensity of the reference light of the coated film. The reflectivity in the z-axial direction may indicate a ratio of the laser light reflected in the +z-axial direction to the radiated laser light.

When the derived reflectivity is greater than or equal to a predetermined reflectivity, the processor 110 may determine that one or more pieces of the optical interference data generated based on the corresponding reference light are valid optical interference data, and may derive the thickness of the coated film using the corresponding optical interference data. The predetermined reflectivity is the minimum reflectivity that is needed when the coated film acts as the reference mirror, and may correspond to the above-described predetermined reference value.

In a case that the derived reflectivity is less than the predetermined reflectivity, the processor 110 may move the light source 150 or the OCT part 170 so as to radiate the laser light onto another region 8020 adjacent to an original measurement region 8010. According to an embodiment, the inspection apparatus 10 may further include a movement part. The movement part may move the light source 150 or the OCT part 170 along the above-described x-axis, y-axis, or z-axis. As described above, the x-axis and the y-axis are axes included in a plane corresponding to the surface of the substrate 2, and may be orthogonal to each other. The z-axis may be an axis corresponding to the direction of a normal line of the substrate. The x-axis and the y-axis may be orthogonal to the z-axis. The processor 110 may control the movement part to move the light source 150 or the OCT part 170 in the x-axial direction and/or y-axial direction, such that the laser light is radiated onto the other region 8020 adjacent to the original measurement region 8010.

According to an embodiment, the processor 110 may control the movement part based on the resolution of one or more pieces of the captured interference light, so as to adjust the position of the light source 150 or the OCT part 170 in the z-axis. That is, the movement part may move the light source 150 or the OCT part 170 in the z-axial direction, based on the resolution of the captured interference light. The interference light is obtained by capturing the interference phenomenon by the above-described reflected light (i.e., the reference light) and scattered light (i.e., the measurement light), and thus, the frequency of interference phenomenon may be determined based on a phase difference according to the travel paths of the laser light, the reflected light and the scattered light. The processor 110 may control the movement part so as to adjust the position of the light source 150 or the OCT part 170 in the z-axis, by which the processor 110 may perform adjustment to obtain an accurate interference signal of the interference light.

In the process of adjusting a measurement region as illustrated in diagram 810, the OCT part 170 may be moved by the movement part. The original region 8010 which is to be measured by the OCT part 170 or to which the laser light is radiated may be moved in the x-axial direction or the y-axial direction. This is because the reflectivity of the coated film on the original region 8010 does not satisfy a predetermined reference value. An adjacent region of which the thickness of the coated film is considered equal to or similar to the thickness of the coated film of the original region 8010, may be determined to be the new radiation region 8020 to which laser light is to be radiated. A region adjacent to one region will be described later. Also, unlike the original region 8010, a region of which the reflectivity for reference light in the +z-axial direction is greater than or equal to a predetermined reference value, may be determined to be the new radiation region 8020. According to an embodiment, a region of which the reflectivity for reference light in the +z-axial direction is at least a predetermined ratio higher than or equal to that of the original region 8010, may be determined to be the new radiation region 8020.

Referring to the sectional diagram 820, as the above-described process proceeds, the light source 150 is moved by the movement part and may radiate the laser light to the new radiation region 8020, as opposed to the original region 8010. In the illustrated embodiment, the reflectivity of the original region 8010 in the +z-axial direction may be less than a predetermined reference value. The surface of the coated film of the original region 8010 is not parallel to the normal line of the substrate, and may be inclined at a predetermined angle or more. Also, the movement part may move the light source 150 or the OCT part 170 in the z-axial direction, based on the resolution of the captured interference light.

According to an embodiment, the radiation angle at which the laser light is to be radiated may be adjusted such that the reflectivity of the surface of the coated film is greater than or equal to a reference value. According to an embodiment, the laser light may be radiated onto a region where the surface of the coated film is parallel to the substrate, such that the reflectivity of the surface of the coated film is greater than or equal to the reference value.

According to an embodiment, the reflectivity of the surface of the coated film may be determined based on a fluorescent pigment mixing ratio of the corresponding coated film. According to an embodiment, the surface of the coated film mixed with fluorescent pigments may have a higher reflectivity than that of the coated film that is not mixed with the fluorescent pigments. As the fluorescent pigment mixing ratio of the coated film increases, the reflectivity of the surface of the coated film may increase. That is, when the coated film mixed with the fluorescence pigments is used, the reflectivity of the surface of the coated film increases, whereby the thickness measurement using the inspection apparatus 10 that does not use the reference mirror may be easily performed. According to an embodiment, the fluorescent pigment mixing ratio of the coated film may be set to a value that enables the reflectivity of the surface of the coated film to exceed a predetermined reference value. According to an embodiment, the reference value may be the minimum reflectivity that is needed when the surface of the coated film performs the role of the reference mirror 172, or may be a value arbitrarily set according to the intention of a user.

According to an embodiment, the backscattering ratio of the coated film may also be determined based on the fluorescent pigment mixing ratio of the corresponding coated film. According to an embodiment, the coated film mixed with the fluorescent pigments may have a higher backscattering ratio than that of the coated film that is not mixed with the fluorescent pigments. In the case of thickness measurement by the inspection apparatus 10 that does not use the reference mirror according to the present disclosure, the backscattering ratio of the coated film may indicate a ratio of the above-described scattered light (i.e., the measurement light) that is backscattered to the laser light radiated to the coated film. As the fluorescent pigment mixing ratio of the coated film increases, the backscattering ratio of the coated film may increase. That is, when the coated film mixed with the fluorescent pigments is used, the reflectivity of the coated film increases, whereby thickness measurement using the inspection apparatus 10 that does not use the reference mirror may be easily performed. According to an embodiment, the fluorescent pigment mixing ratio of the coated film may be set to a value that enables the backscattering ratio of the coated film to exceed a predetermined reference value.

According to an embodiment, the surface of the coated film may be formed to be a curved surface. According to an embodiment, the surface of the coated film may be formed to be a convexly curved surface of a substrate, a concavely curved surface, or a curved surface provided in an arbitrary shape. According to an embodiment, in the case in which the surface of the coated film is the curved surface, the thickness measurement using the inspection apparatus 10 that does not use the reference mirror may be more easily performed than the case in which the surface of the coated film is a flat surface.

Figure 9:
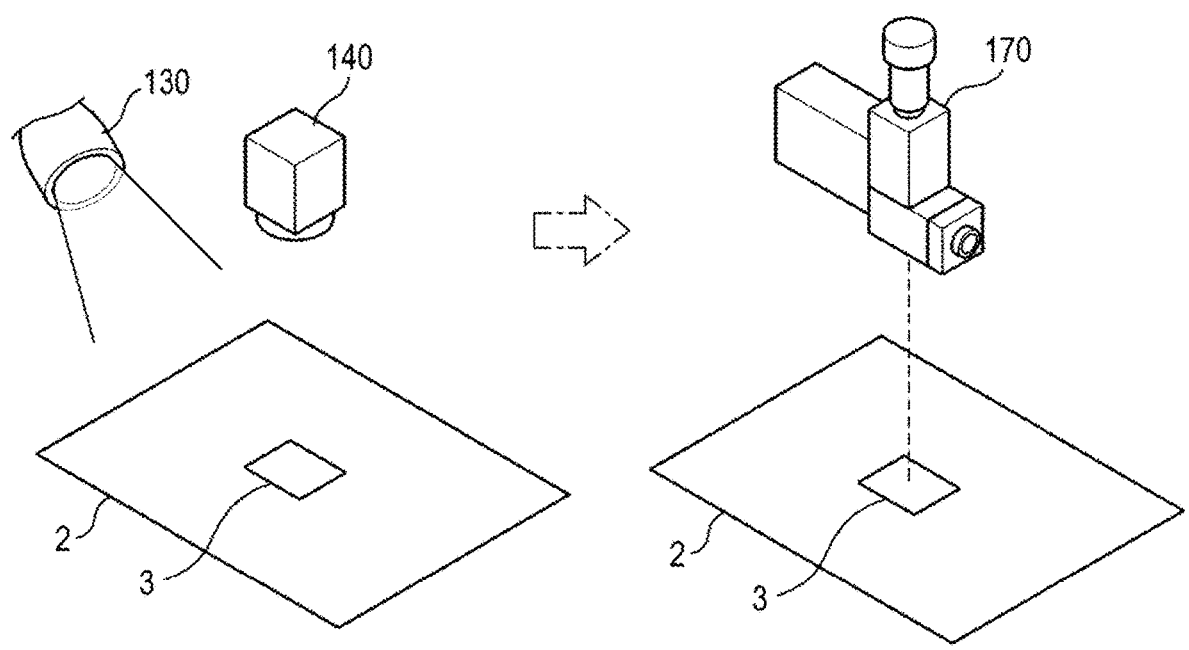
FIG. 9 is a diagram illustrating a process in which the inspection apparatus 10 samples a region for performing a thickness measurement using an OCT part 170, by a photographic inspection using fluorescent pigments, according to an embodiment of the present disclosure.

FIG. 9 is a diagram illustrating a process in which the inspection apparatus 10 samples a region for performing the thickness measurement using the OCT part 170, by photographic inspection using the fluorescent pigments, according to an embodiment of the present disclosure. According to an embodiment, the inspection apparatus 10 may perform the photographic inspection of the entirety of the substrate, using the fluorescent pigments, may derive a predetermined region corresponding to a predetermined reference, and may additionally measure the thickness of the coated film of the derived region using the OCT.

First, the inspection apparatus 10 may perform the photographic inspection of the substrate 2 using the fluorescent pigments. The photographic inspection may be a fluorescent photographic inspection. To this end, the coated film to be spread on the substrate 2 may be mixed with the fluorescent pigments in advance. According to an embodiment, the inspection apparatus 10 may further include the additional light source 130 and the additional light detector 140. The additional light source 130 of the inspection apparatus 10 may radiate the ultraviolet light onto the coated film of the substrate. The radiated ultraviolet light may excite the fluorescent pigments that are mixed in the coated film and may generate the fluorescence. The additional light detector 140 of the inspection apparatus 10 may capture the fluorescence and may obtain a 2D image of the coated film of the substrate. The 2D image may be a 2D fluorescent image according to the embodiment.

The inspection apparatus 10 may derive one or more regions 3 on the substrate 2 according to a predetermined reference, based on the result of the photographic inspection. The inspection apparatus 10 may derive the amount of spread of the coated film which is spread on the substrate 2, from the 2D image. The inspection apparatus 10 may obtain luminance information for each of the plurality of regions of the substrate 2 from the obtained 2D image. When the ultraviolet light is radiated, the luminance of each region of the coated film may be different based on the amount of fluorescent pigments. The inspection apparatus 10 may derive the amount of spread of the coated film for each region, using the luminance of each region.

Subsequently, the inspection apparatus 10 may derive the predetermined region 3 based on the amount of spread. For example, a region of which the amount of spread is less than or equal to a predetermined reference may be derived as the predetermined region 3. The inspection apparatus 10 may additionally measure the thickness of the derived region 3 using the OCT part 170, as described above. The OCT part 170 of the inspection apparatus 10 may obtain the optical interference data associated with the derived region 3, and may measure the thickness of the coated film spread on the region 3 of the substrate based on the obtained optical interference data.

According to an embodiment, the additional light source 130 may be disposed so as to radiate the ultraviolet light onto the substrate, and the relative position of the additional light source 130 on the substrate, a radiation angle of the ultraviolet light, the brightness of the ultraviolet light, and the like may be variously configured. According to an embodiment, the inspection apparatus 10 may include a plurality of additional light sources 130. According to an embodiment, the additional light detector 140 may capture the fluorescence generated from the coated film by the ultraviolet light. According to an embodiment, the inspection apparatus 10 may include a plurality of additional light detectors 140. The additional light detector 140 may be embodied as the CCD or the CMOS.

Figure 10:
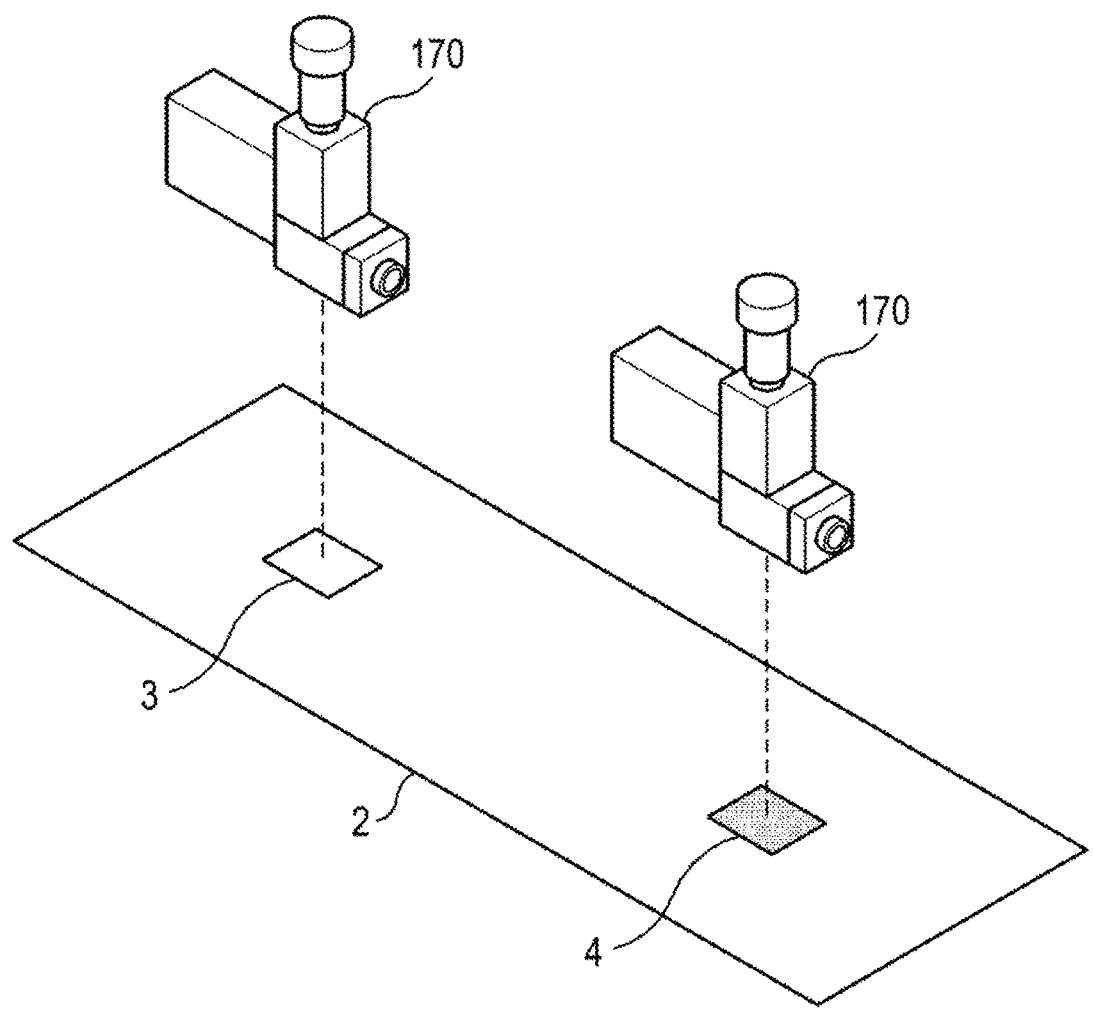
FIG. 10 is a diagram illustrating a process in which the inspection apparatus 10 additionally samples a region for performing the thickness measurement using the OCT part 170, based on element arrangement, according to an embodiment of the present disclosure.

FIG. 10 is a diagram illustrating a process in which the inspection apparatus 10 additionally samples a region for performing the thickness measurement using the OCT part 170, based on element arrangement, according to an embodiment of the present disclosure. According to an embodiment, the processor 110 may derive a region 4 of which the element arrangement is the same or similar to that of the region 3 of which the amount of spread, obtained from the 2D image, is less than or equal to a predetermined amount of spread, and may control the OCT part 170 so as to derive the thickness of the region 4. In other words, the processor 110 may derive a region having the same or similar element arrangement based on the element arrangement information, and may measure the thickness of the region using the OCT. The region having the same or similar element arrangement may have a similar thickness of the spread coated film. The region having the same or similar element arrangement to that of one region may have a similar thickness of the coated film. In the present disclosure, the element arrangement information may be information indicating the arrangement of elements disposed on the substrate 2. The element arrangement information may indicate information associated with the positions, orientations or the elements installed on the substrate 2, and the areas occupied thereby.

First, the processor 110 may derive the region 3 of which the amount of spread obtained via the 2D image is less than or equal to a predetermined amount of spread, as described above. According to an embodiment, the processor 110 may measure the thickness of the region 3 using the OCT part 170. In addition, the processor 110 may derive the region 4 which has the same element arrangement as that of the derived region 3 on the substrate 2. The region 4 may be selected from regions (regions excluding the first region) of which the amount of spread derived from the 2D image exceeds the predetermined amount of spread. The processor 110 may derive the corresponding region 4 based on the above-described element arrangement information. The processor 110 may derive the thickness of the additionally derived region 4 using the OCT part 170. The processor 110 may control the light source 150 and the light detector 160, so as to obtain the optical interference data generated by laser light being reflected from the corresponding region 4. The processor 110 may derive the thickness of the coated film spread on the region 4, based on the obtained optical interference data. In the present disclosure, the fact that the processor 110 obtains the optical interference data of the one region by controlling the light source 150 and the light detector 160 may indicate that the light source 150 radiates the laser light onto the corresponding one region, and that the light detector 160 obtains the optical interference data associated with the interference light generated from the one region.

According to an embodiment, the processor 110 may derive the region 4, of which the element arrangement is similar to that of the region 3, which has been derived from the 2D image, and may measure the thickness of the region 4 using the OCT. Here, whether the element arrangements of the two regions 3 and 4 are similar to each other may be determined based on the element arrangement information associated with the two regions 3 and 4. The processor 110 may calculate the similarity of the element arrangements of the two regions 3 and 4 based on the areas that elements occupy in the regions 3 and 4, the arrangements, the type, and the form of the elements, the positions of electrodes of the elements, or the like, and may determine whether the element arrangements of the two regions 3 and 4 are similar to each other based on the calculated similarity.

According to an embodiment, the processor 110 may adjust the above-described luminance information based on the density of elements and an element arrangement on the substrate 2, and may derive the amount of spread of the coated film of a corresponding region based on the adjusted luminance information. Particularly, the processor 110 may obtain the element arrangement information indicating the arrangement of elements on the substrate 2 from the memory 120. The processor 110 may derive the element density information for each region on the substrate 2, based on the above-described element arrangement information. The processor 110 may adjust the luminance information derived from the 2D image, based on the element density information. The fluorescent pigments may not be evenly spread on a region having a high element density on the substrate 2. In the region with a high element density, that is, the region where elements are densely disposed, the fluorescent pigments may be accumulated and thus, the luminance may be measured to be high. The processor 110 may adjust the obtained luminance information by taking into consideration luminance distortion by element density. To adjust the luminance information, accumulated information indicating the relationship between the element density and the luminance may be used. The information may be collected in a database and may be stored in the memory 120. The processor 110 may derive the amount of spread on each region of the substrate 2 based on the adjusted luminance information.

Figure 11:
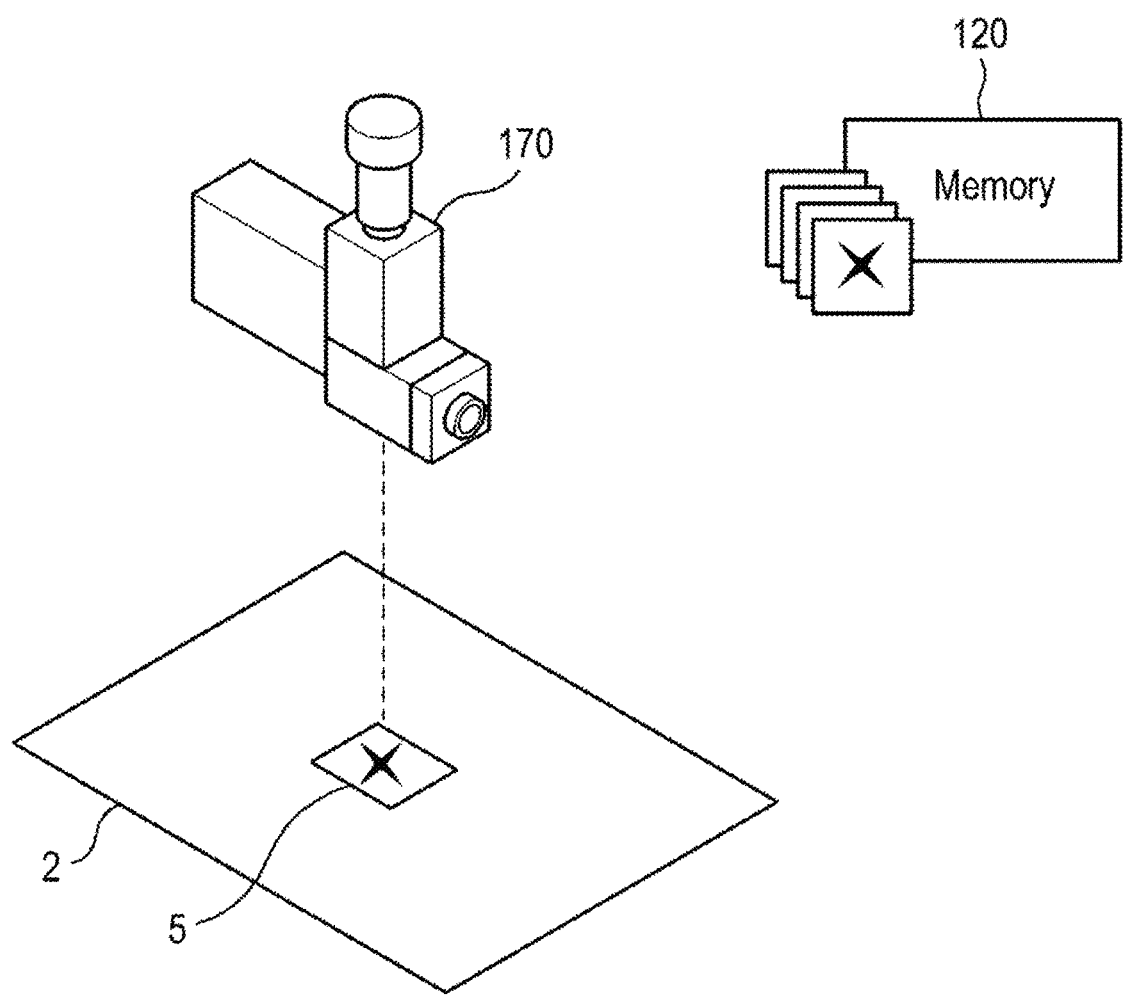
FIG. 11 is a diagram illustrating a process in which the inspection apparatus 10 additionally samples a region for performing the thickness measurement using the OCT part 170, based on a defective region, according to an embodiment of the present disclosure.

FIG. 11 is a diagram illustrating a process in which the inspection apparatus 10 additionally samples a region for performing the thickness measurement using the OCT part 170, based on a defective region, according to an embodiment of the present disclosure. According to an embodiment, the processor 110 may derive a region 5 which is identified as a region having a defect on the substrate 2 based on the element arrangement information and/or the 2D image, and may derive the thickness of the region 5 by controlling the OCT part 170. When the amount of spread on a part including a predetermined defect on the substrate 2 or the coated film, for example, a part including a crack, an exfoliation, an unevenness, a curve, or the like is measured via 2D photographic inspection, the result may include an error. Accordingly, the thickness of the coated film of the region 5 which is identified as a region including a predetermined defect based on the element arrangement information and/or the 2D image, may be additionally measured using the OCT part 170.

The processor 110 may determine the region 5, which is identified as a region including a predetermined defect on the substrate 2, based on the element arrangement information and/or the 2D image obtained from the memory 120. The 2D image may be a picture obtained by actually photographing the form of the substrate 2 and the coated film. The element arrangement information may show the form of the substrate 2 and the expected form in which the coated film is spread according to a predetermined specification. The processor 110 may determine a region in which the current substrate 2 and the coated film have features different from the predetermined standard, based on the element arrangement information and the 2D image. That is, the processor 110 may determine that the corresponding feature is a defect. The processor 110 may derive the region 5 where the defect exists.

The processor 110 may derive the thickness of the derived region 5 using the OCT part 170. The processor 110 may control the light source 150 and the light detector 160, so as to obtain the optical interference data generated by the laser light being reflected from the corresponding region 5. The processor 110 may derive the thickness of the coated film spread on the region 5, based on the obtained optical interference data.

According to an embodiment, the operation of deriving the additional measurement region based on a defective region may be performed independently from the operation of deriving the additional measurement region based on the above-described 2D image.

Also, according to an embodiment, the processor 110 may derive a region including an electrode part based on the electrode position information indicating the positions of electrodes of elements on the substrate 2, and may additionally measure the thickness of the region by controlling the OCT part 170. In the present disclosure, the electrode position information may be information indicating the positions of the electrodes of the elements disposed on the substrate 2. For example, each element may have an electrode part in order to connect fine wiring between an element and the substrate. The electrode may be referred to as an element leg or a chip leg. The electrode position information may indicate the positions where the electrodes of elements exist on the substrate 2. Generally, at the electrode part of an element, the fluorescent pigments may agglomerate due to the density of element legs, whereby the thickness measurement based on the 2D image may be inaccurate. Accordingly, the thickness of the part where the electrode of an element exists may be additionally measured using the OCT, whereby the accuracy of the process of measuring the overall thickness may be increased.

The processor 110 may be aware of the positions where the electrodes of the elements exist on the substrate 2, based on the electrode position information obtained from the memory 120. The processor 110 may derive a region on the substrate 2 where an electrode exits. According to an embodiment, the region may be selected from regions (regions excluding the first region) of which the amount of spread derived from the 2D image exceeds a predetermined amount of spread.

The processor 110 may derive the thickness of the derived region using the OCT part 170. The processor 110 may control the light source 150 and the light detector 160, so as to obtain the optical interference data generated by the laser light being reflected from the corresponding region. The processor 110 may derive the thickness of the coated film spread on the region, based on the obtained optical interference data.

Figure 12:
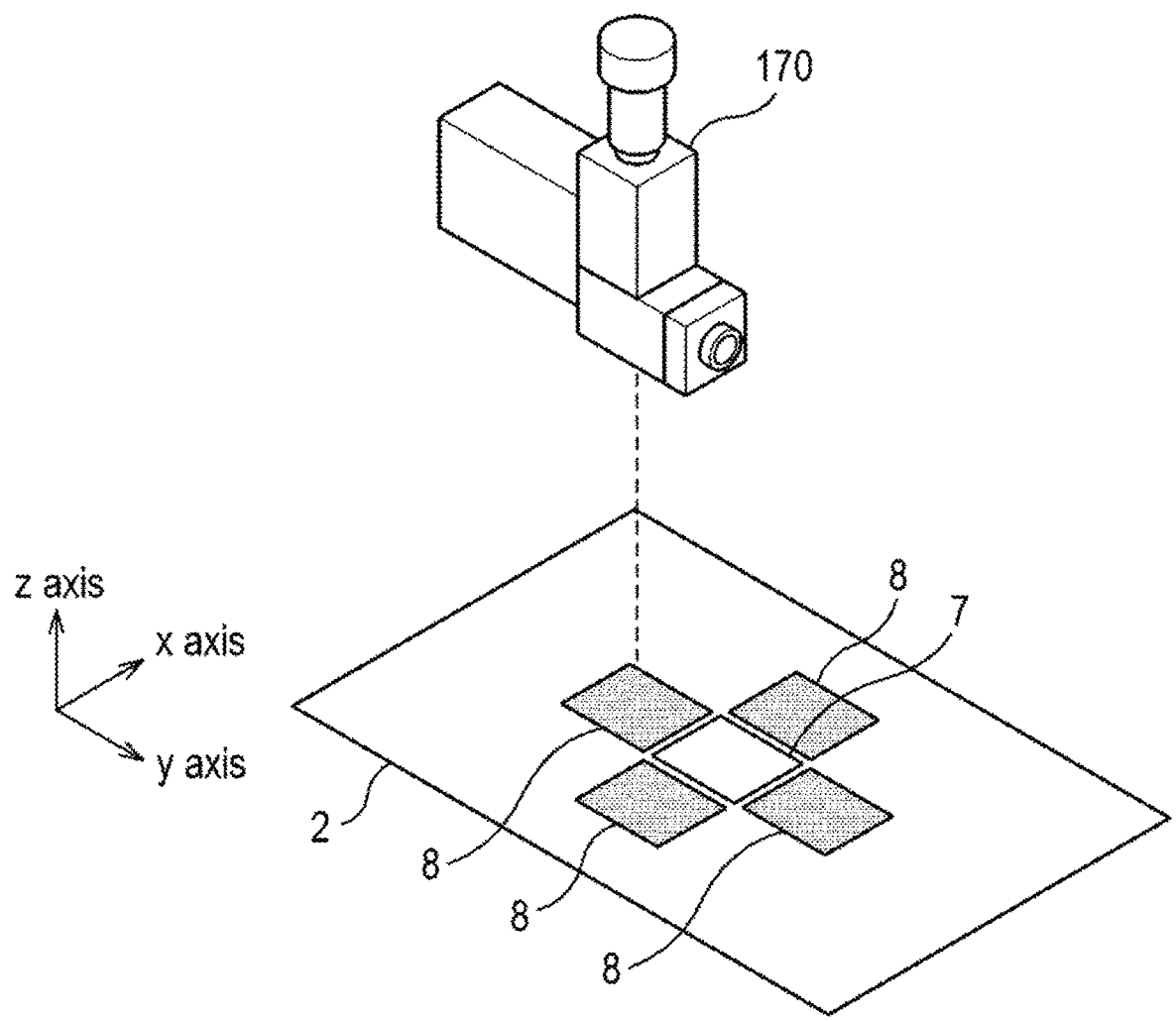
FIG. 12 is a diagram illustrating a process in which the inspection apparatus 10 additionally samples a region adjacent to a region for performing the thickness measurement using the OCT part 170, according to an embodiment of the present disclosure.

FIG. 12 is a diagram illustrating a process in which the inspection apparatus 10 additionally samples a region adjacent to a region for performing the thickness measurement using the OCT part 170, according to an embodiment of the present disclosure. In the case of regions on the substrate 2 derived according to various embodiments of the present disclosure, that is, a region 7 to which additional thickness measurement using the OCT is performed, the inspection apparatus 10 may additionally measure the thickness of regions 8 adjacent to the region 7 using the OCT.

The derived region 7 may be a region where thickness measurement using the OCT may be performed in addition to the 2D photographing inspection for accurately measuring the thickness of the coated film. The regions adjacent to the region 7 may have features similar to those of the region 7 with regard to the substrate 2 or the coated film. Accordingly, in order to secure the accuracy of the overall thickness measurement, the additional thickness measurement using the OCT may be performed with respect to adjacent regions.

Here, the adjacent regions indicate regions located close to the corresponding region 7 when the substrate 2 is divided into a plurality of regions. According to an embodiment, the adjacent region may indicate a region that shares a boundary line with the corresponding region 7 from among the plurality of regions. According to an embodiment, the adjacent region may indicate a region located within a predetermined radius from the center of the corresponding region 7, from among the plurality of regions. According to an embodiment, when axes corresponding to the horizontal direction and the vertical direction of the substrate are the x-axis and y-axis, respectively, the adjacent region may be a region that is located in the +x-axial direction, the −x-axial direction, the +y-axial direction, or the −y-axial direction of the region 7, and shares a boundary line with the corresponding region 7. According to an embodiment, the adjacent region may include a region that shares a vertex with the corresponding region 7, and is located in the diagonal direction, from among the plurality of regions.

According to an embodiment, the processor 110 may remeasure a thickness using the OCT, based on the amount of spread derived from the 2D image and the thickness value measured by the OCT part 170. According to an embodiment, when a difference between the thickness value of the coated film of a corresponding region, which is derived from the amount of spread based on the qualitative inspection and the thickness value measured using the OCT is greater than or equal to a predetermined value, the thickness of the corresponding region may be remeasured using the OCT. Also, according to an embodiment, based on the amount of spread and the thickness value that are derived, when it is determined that the thickness value does not satisfy a predetermined reference, a thickness may be remeasured. Here, the predetermined reference may be a reference to determine whether at least one of the amount of spread or the thickness, which are derived, is wrongly measured, in consideration of the relationship between the amount of spread and the thickness which were previously measured. That is, when it is determined that the measurement has an error in consideration of the amount of spread and the thickness value, the measurement may be performed again. Also, according to an embodiment, the processor 110 may control the OCT part 170 and may remeasure the thickness of a region adjacent to a corresponding region, based on the amount of spread of the corresponding region derived from the 2D image and the thickness value of the corresponding region measured by the OCT part 170.

Figure 13:
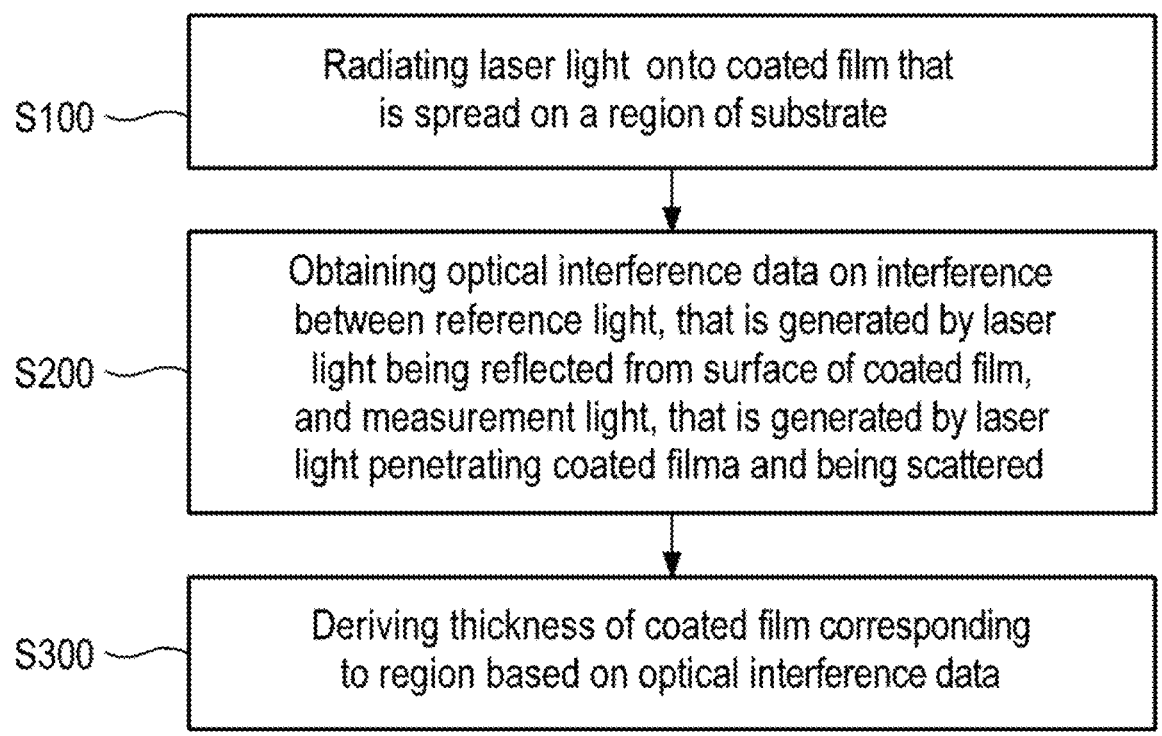
FIG. 13 is a diagram illustrating an embodiment of a substrate inspection method, which may be performed by the inspection apparatus 10 according to the present disclosure.

FIG. 13 is a diagram illustrating an embodiment of a substrate inspection method, which may be performed by the inspection apparatus 10 according to the present disclosure. Although the flowchart has described that the operations of a method and an algorithm according to the present disclosure are performed sequentially, the operations may be performed in a different order that is arbitrarily combined based on the present disclosure, in addition to being performed in the sequential order. The descriptions associated with the flowchart do not exclude modification or correction of the method or the algorithm, and do not indicate that a predetermined operation is essential or preferable. According to an embodiment, at least some operations may be performed in parallel, repetitively, or heuristically. According to an embodiment, at least some operations may be omitted or other operations may be added.

The inspection apparatus 10 according to the present disclosure may perform a substrate inspection method according to various embodiments of the present disclosure in order to perform a substrate inspection. The substrate inspection method according to an embodiment of the present disclosure may include: step S100 of radiating the laser light onto the coated film that is spread on the region of the substrate; step S200 of obtaining the optical interference data on the interference between the reference light, that is generated by the laser light being reflected from the surface of the coated film, and the measurement light, that is generated by the laser light penetrating the coated film and being scattered; and/or step S300 of deriving the thickness of the coated film corresponding to the one region based on the optical interference data.

In step S100, the light source 150 of the inspection apparatus 10 may radiate the laser light onto the coated film that is spread on the region of the substrate. In step S200, the light detector 160 may obtain the optical interference data on the interference between the reference light, that is generated by the laser light being reflected from the surface of the coated film, and the measurement light, that is generated by the laser light penetrating the coated film and being scattered. In step S300, the processor 110 may derive the thickness of the coated film corresponding to the region, based on the optical interference data.

According to an embodiment, step S300 of deriving the thickness of the coated film may include a step in which the processor 110 obtains a sectional image that shows a section cut in the depth direction of the coated film based on the optical interference data; and/or a step in which the processor 110 determines the thickness of the coated film based on a boundary line in the sectional image.

According to an embodiment, step S300 of deriving the thickness of the coated film may include: a step in which the processor 110 obtains a plurality of sectional images of the one region, which are obtained in advance from the memory; and/or a step in which the processor 110 determines a reference boundary line from among a plurality of boundary lines in the plurality of sectional images, and derives the thickness of the coated film of the one region, based on the reference boundary line.

According to an embodiment, the reference boundary line may be a boundary line corresponding to one of the mean value, the median value, and the mode value of the plurality of boundary lines.

According to an embodiment, the reference boundary line may be a boundary line corresponding to the mean value of boundary lines that satisfy a predetermined criterion from among the plurality of boundary lines.

According to an embodiment, the substrate inspection method may further include: a step in which the light detector 160 derives the reflectivity of the surface of the coated film based on the intensity of the reference light; and/or a step of moving the light source in case the reflectivity is less than a predetermined reflectivity. The movement may be performed by the above-described movement part.

According to an embodiment, the laser light is radiated onto the above-described one region in a first direction, and the reference light and the measurement light proceed along the direction opposite to the first direction and may be captured by the light detector. According to an embodiment, the laser light may be directly radiated onto the surface of the coated film without penetrating a medium other than air.

Various embodiments of the present disclosure may be implemented as software in a machine-readable storage medium. The software may be software for implementing various embodiments of the present disclosure. The software may be inferred from various embodiments of the present disclosure by programmers in the field of the art to which the present disclosure belongs. For example, the software may be a program including instructions (e.g., code or code segment) which are readable by a device. The device may be a device such as a computer, which is operable according to instructions retrieved from a storage medium. According to an embodiment, the device may be the inspection apparatus 10 according to embodiments of the present disclosure. According to an embodiment, a processor of the device may execute retrieved instructions, such that the elements of the device perform functions corresponding to the instructions. According to an embodiment, the processor may be the processor 110 according to embodiments of the present disclosure. The storage medium may indicate all types of recording media storing data which are readable by a device. The storage medium may include, for example, ROM, RAM, a CD-ROM, magnetic tape, a floppy disk, an optical data storage device, or the like. According to an embodiment, the storage medium may be the memory 120. According to an embodiment, the storage medium may be implemented to be distributed in computer systems or the like connected via a network. The software may be stored distributedly in a computer system or the like, and may be executed. The storage medium may be a non-transitory storage medium. The non-transitory storage medium indicates a tangible medium that exists irrespectively of semi-permanent or temporary storage of data, and does not include a signal that is propagated in a transient manner.

According to various embodiments of the present disclosure, the substrate inspection apparatus can accurately measure the thickness of a coated film even when the coated film is as thin as a predetermined thickness (e.g., 30 µm) or less.

According to various embodiments of the present disclosure, the substrate inspection apparatus can measure the thickness of a coated film without using an element such as a reference mirror or the like, whereby errors in measurement caused by saturation of light may be reduced.

According to various embodiments, the substrate inspection apparatus can shorten the amount of time spent measuring the thickness of the coated film of the entire substrate by sampling a specific region.

While certain embodiments have been described, these embodiments have been presented by way of example only, and are not intended to limit the scope of the disclosure. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A substrate inspection apparatus comprising:
    a light source configured to radiate laser light onto a region of a coated film that is spread on a substrate;
    a light detector configured to obtain optical interference data on an interference between reference light, that is generated by the laser light being reflected from a surface of the region of the coated film, and measurement light, that is generated by the laser light penetrating the region of the coated film and being scattered;
    a processor; and
    a component mover, controlled by the processor, configured to move the light source,
    wherein the processor is configured to:
        derive a reflectivity of the surface from an intensity of the reference light;
        determine whether the reflectivity is less than a predetermined reflectivity stored in a memory;
        upon the determination that the reflectivity is not less than the predetermined reflectivity, derive a thickness of the coated film corresponding to the region based on the optical interference data; and
        upon the determination that the reflectivity is less than the predetermined reflectivity, control the component mover to move the light source so as to radiate the laser light onto another region of the coated film on the substrate.

2. The substrate inspection apparatus of claim 1, wherein the processor is further configured to:

obtain a sectional image that shows a section cut in a depth direction of the region of the coated film based on the optical interference data; and determine the thickness of the coated film based on boundary lines in the sectional image.

3. The substrate inspection apparatus of claim 1, wherein the light source is further configured to radiate the laser light onto the coated film along a first direction, and the light detector is further configured to capture the reference light and the measurement light that proceed along a direction opposite to the first direction, and obtain the optical interference data.

4. The substrate inspection apparatus of claim 1, wherein the light source is disposed such that the laser light is directly radiated onto the surface of the coated film without penetrating a medium other than air.

5. The substrate inspection apparatus of claim 1, wherein the reflectivity of the surface of the coated film with respect to the laser light is determined based on a fluorescent pigment mixing ratio of fluorescent pigments that are mixed in the coated film, and wherein the fluorescent pigment mixing ratio is set to a value that enables the reflectivity to exceed a predetermined reference value.

6. The substrate inspection apparatus of claim 1, wherein the coated film is formed of at least one material selected from acrylic, urethane, polyurethane, silicone, epoxy, an ultraviolet (UV) curable material, and an infrared (IR) curable material.

7. The substrate inspection apparatus of claim 1, wherein the surface of the coated film is formed to be a curved surface.

8. A substrate inspection method, comprising:

radiating laser light from a light source onto a region of a coated film that is spread on a substrate;

obtaining optical interference data on an interference between reference light, that is generated by the laser light being reflected from a surface of the region of the coated film, and measurement light, that is generated by the laser light penetrating the region of the coated film and being scattered;

deriving a reflectivity of the surface from an intensity of the reference light;

determining whether the reflectivity is less than a predetermined reflectivity;

upon the determination that the reflectivity is not less than the predetermined reflectivity, deriving a thickness of the coated film corresponding to the region based on the optical interference data; and upon the determination that the reflectivity is less than the predetermined reflectivity, moving the light source so as to radiate the laser light onto another region of the coated film on the substrate.

9. The substrate inspection method of claim 8, wherein the deriving the thickness of the coated film includes:

obtaining a sectional image that shows a section cut in a depth direction of the region of the coated film, based on the optical interference data; and determining the thickness of the coated film based on boundary lines in the sectional image.

10. The substrate inspection method of claim 8, wherein the laser light is radiated onto the region along a first direction, and the reference light and the measurement light proceed along a direction opposite to the first direction.

11. The substrate inspection method of claim 8, wherein the laser light is directly radiated onto the surface of the coated film without penetrating a medium other than air.

12. The substrate inspection method of claim 8, wherein the reflectivity of the surface of the coated film with respect to the laser light is determined based on a fluorescent pigment mixing ratio of fluorescent pigments that are mixed in the coated film, and wherein the fluorescent pigment mixing ratio is set to a value that enables the reflectivity to exceed a predetermined reference value.

13. The substrate inspection method of claim 8, wherein the coated film is formed of at least one material selected from acrylic, urethane, polyurethane, silicone, epoxy, an UV curable material, and an IR curable material.

14. The substrate inspection method of claim 8, wherein the surface of the coated film is formed to be a curved surface.

* * * * *